US011390276B2

United States Patent
Yamada et al.

(10) Patent No.: US 11,390,276 B2
(45) Date of Patent: Jul. 19, 2022

(54) CONTROL DEVICE, CONTROL METHOD, AND NON-TRANSITORY STORAGE MEDIUM

(71) Applicant: CANON KABUSHIKI KAISHA, Tokyo (JP)

(72) Inventors: Tomohiro Yamada, Tokyo (JP); Takahiro Takahashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 179 days.

(21) Appl. No.: 16/682,583

(22) Filed: Nov. 13, 2019

(65) Prior Publication Data
US 2020/0079368 A1    Mar. 12, 2020

Related U.S. Application Data

(63) Continuation of application No. PCT/JP2018/018305, filed on May 11, 2018.

(30) Foreign Application Priority Data

May 15, 2017   (JP) .............................. JP2017-096717
May 8, 2018    (JP) .............................. JP2018-089894

(51) Int. Cl.
*B60W 30/09*      (2012.01)
*B60W 40/09*      (2012.01)
(Continued)

(52) U.S. Cl.
CPC ............ *B60W 30/09* (2013.01); *B60W 40/09* (2013.01); *G05D 1/0055* (2013.01);
(Continued)

(58) Field of Classification Search
CPC .. B60W 30/09; B60W 40/09; B60W 2754/30; B60W 2420/42; B60W 2540/30;
(Continued)

(56) References Cited

U.S. PATENT DOCUMENTS

| 10,308,246 B1 * | 6/2019 | Konrardy .............. B60R 25/102 |
| 2015/0243172 A1 * | 8/2015 | Eskilson .................. G08G 1/22 701/1 |

(Continued)

FOREIGN PATENT DOCUMENTS

| CN | 101746269 A | 6/2010 |
| CN | 104019802 A | 9/2014 |

(Continued)

OTHER PUBLICATIONS

English_Translation_JP2015014845A (Year: 2015).*

(Continued)

*Primary Examiner* — Peter D Nolan
*Assistant Examiner* — Ashley L Redhead, Jr.
(74) *Attorney, Agent, or Firm* — Cowan, Liebowitz & Latman, P.C.

(57) ABSTRACT

A control device that controls a vehicle includes: an input unit to which an image including another vehicle or a driver of another vehicle is input; and a control unit that outputs a signal for controlling the vehicle generated based on danger in the another vehicle determined based on the image.

27 Claims, 10 Drawing Sheets

(51) Int. Cl.
  *G05D 1/00*   (2006.01)
  *G08G 1/16*   (2006.01)
(52) U.S. Cl.
  CPC ........... *G05D 1/0088* (2013.01); *G08G 1/166* (2013.01); *B60W 2420/42* (2013.01); *B60W 2540/30* (2013.01); *B60W 2754/30* (2020.02); *G05D 2201/0213* (2013.01)
(58) Field of Classification Search
  CPC ........... B60W 2050/143; B60W 50/14; B60W 2554/804; B60W 2554/802; B60W 2552/53; B60W 30/18163; B60W 30/16; B60W 2554/4047; B60W 2554/4046; B60W 2554/402; G05D 1/0088; G05D 1/0055; G05D 2201/0213; G08G 1/166
  See application file for complete search history.

(56) References Cited

U.S. PATENT DOCUMENTS

| | | | |
|---|---|---|---|
| 2016/0321511 | A1 | 11/2016 | Abhau |
| 2018/0120837 | A1* | 5/2018 | Regmi .................... A61B 5/01 |

FOREIGN PATENT DOCUMENTS

| | | | | |
|---|---|---|---|---|
| CN | 105046255 | A | | 11/2015 |
| CN | 106394553 | A | | 2/2017 |
| CN | 106462027 | A | | 2/2017 |
| CN | 106530831 | A | | 3/2017 |
| JP | 05-238367 | A | | 9/1993 |
| JP | 07-146137 | A | | 6/1995 |
| JP | H07146137 | A | * | 6/1995 |
| JP | 09-311996 | A | | 12/1997 |
| JP | 2002-046506 | A | | 2/2002 |
| JP | 2006-176069 | A | | 7/2006 |
| JP | 2007210403 | A | * | 8/2007 |
| JP | 2008037218 | A | * | 2/2008 |
| JP | 2008-252494 | A | | 10/2008 |
| JP | 2008252494 | A | * | 10/2008 |
| JP | 2010097443 | A | * | 4/2010 |
| JP | 4895126 | B | | 3/2012 |
| JP | 2013-206183 | A | | 10/2013 |
| JP | 2015-014845 | A | | 1/2015 |
| JP | 2015014845 | A | * | 1/2015 |
| JP | 2016-139181 | A | | 8/2016 |
| JP | 2016-151913 | A | | 8/2016 |
| JP | 2017-004397 | A | | 1/2017 |
| JP | 2017-030748 | A | | 2/2017 |
| JP | 2018012483 | A | * | 1/2018 ............... B60R 1/00 |
| WO | 2015/008419 | A1 | | 1/2015 |
| WO | 2015/122406 | A1 | | 8/2015 |
| WO | 2016/170785 | A1 | | 10/2016 |

OTHER PUBLICATIONS

English_Translation_JP2007210403A (Year: 2007).*
English_Translation_JP2010097443A (Year: 2010).*
English_Translation_JP2008252494A (Year: 2008).*
English_Translation_JP2008037218A (Year: 2008).*
English_Translation_JPH07146137A (Year: 1995).*
English Translation_JP2018012483A (Year: 2016).*
Jun. 1, 2021 Chinese Office Action, which is enclosed with an English Translation, that issued in Chinese Patent Application No. 201880032594.0.
The International Search Report dated Aug. 7, 2018 of International Application No. PCT/JP2018/018305.
PCT/IB/326 (PCT Notification Concerning Transmittal of International Preliminary Report on Patentability).
PCT/IB/373 (PCT International Preliminary Report on Patentability).
PCT/ISA/237 (PCT Written Opinion of the International Searching Authority).
PCT/IB/338 (PCT Notification of Transmittal of Translation of the International Preliminary Report on Patentability).

* cited by examiner

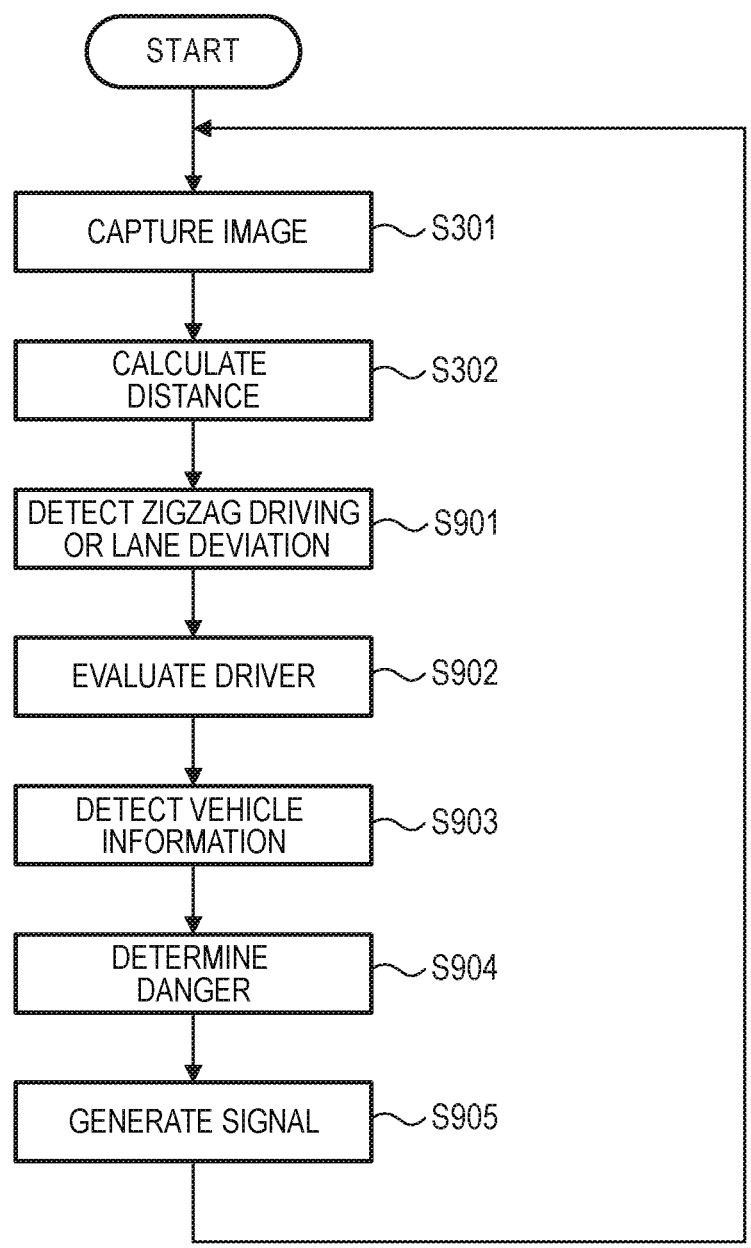

CONTROL DEVICE, CONTROL METHOD, AND NON-TRANSITORY STORAGE MEDIUM

CROSS-REFERENCE TO RELATED APPLICATIONS

This application is a Continuation of International Patent Application No. PCT/JP2018/018305, filed May 11, 2018, which claims the benefit of Japanese Patent Application No. 2017-096717, filed May 15, 2017, and Japanese Patent Application No. 2018-089894, filed May 8, 2018, all of which are hereby incorporated by reference herein in their entirety.

BACKGROUND OF THE INVENTION

Field of the Invention

The present invention relates to a control device and a control method.

Description of the Related Art

Recently, various technologies for controlling a vehicle have been proposed to suppress traffic accidents. Japanese Patent Application Laid-Open No. 2016-151913 proposes a technology for issuing an alert when the following distance between a subject vehicle and a following vehicle decreases. Further, Japanese Patent No. 4895126 proposes a technology for acquiring vehicle model information based on the arrangement of turned-on light sources that are included in a vehicle lamp.

As discussed above, there is a demand for a technology that can realize further suppression of traffic accidents, and the object of the present invention is to provide a control device and a control method that can further improve safety of a subject vehicle.

SUMMARY OF THE INVENTION

According to one aspect of an embodiment, provided is a control device having a control unit that controls a vehicle, and the control unit acquires information on a driver of another vehicle, and generates and outputs a signal for controlling traveling of the vehicle based on information on the driver of the another vehicle.

Further features of the present invention will become apparent from the following description of exemplary embodiments with reference to the attached drawings.

BRIEF DESCRIPTION OF THE DRAWINGS

FIG. 9 is a flowchart illustrating an operation of the control device according to a third embodiment.

DESCRIPTION OF THE EMBODIMENTS

Embodiments of the present invention will be described below in detail by using the drawings. Note that the present invention is not limited to the embodiments described below. Further, the embodiments described below may be appropriately combined to each other.

First Embodiment

Figure 1:
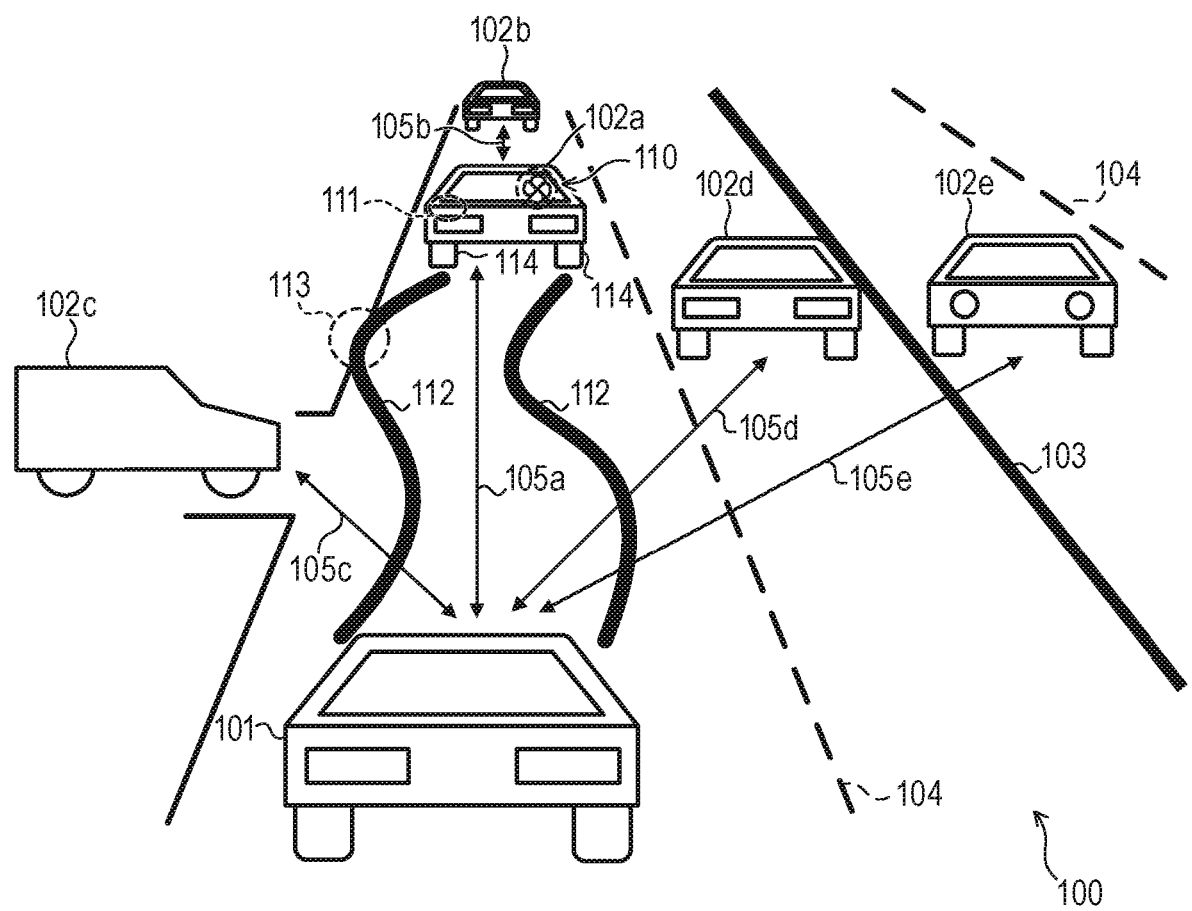
FIG. 1 is a diagram illustrating an example of a view in which vehicles are traveling on a road.

A control device and a control method according to a first embodiment will be described by using the drawings. FIG. 1 is a diagram illustrating an example of a view in which vehicles are traveling on a road. As illustrated in FIG. 1, marks such as white lines that define traveling lanes are provided on a road 100. For example, a roadway center line (a center line) 103, vehicular lane boundaries 104, vehicular line outermost lines (not illustrated), and the like are indicated on the road 100. A vehicle 101 equipped with a control device 200 (see FIG. 2) according to the present embodiment is referred to as a subject vehicle, and each of vehicles 102a to 102e other than the subject vehicle is referred to as another vehicle. As illustrated in FIG. 1, the vehicle 101 and other vehicles 102a to 102e travel on the road 100. Another vehicle 102a traveling in front of the vehicle 101 is also referred to as a preceding vehicle. Another vehicle 102b traveling in front of the preceding vehicle 102a is also referred to as a pre-preceding vehicle. The reference 105a indicates a distance from the vehicle 101 to the preceding vehicle 102a (a following distance). The reference 105b indicates a distance from the preceding vehicle 102a to the pre-preceding vehicle 102b. The reference 105c indicates a distance from the vehicle 101 to another vehicle 102c on the side road. The reference 105d indicates a distance from the vehicle 101 to another vehicle 102d traveling on a passing lane. The reference 105e indicates a distance from the vehicle 101 to another vehicle 102e traveling on the opposing lane. Note that the reference 102 is used when a general another vehicle is described, and one any of the references 102a to 102e is used when an individual another vehicle is described. Further, the reference 105 is used when a general distance or a general following distance is described, and any one of the references 105a to 105e is used when an individual distance or an individual following distance is described. A label 110 such as a label of a newly-licensed driver or a label of an elderly driver may be attached to another vehicle 102. Further, a vehicle model plate 111 or the like is attached to another vehicle 102. The references 112 conceptually illustrates a view of zigzag driving. The reference 113 indicates an example of a position where the preceding vehicle 102a deviates from the lane.

To reduce a possibility of the vehicle 101 colliding with the preceding vehicle 102a, it is important for the vehicle 101 not to come excessively close to the preceding vehicle 102a to ensure a sufficient following distance 105a to the preceding vehicle 102a. The following distance 105 to be ensured may be approximately a stopping distance estimated from the traveling speed of the vehicle 101. A stopping distance corresponds to the sum of a free running distance, which is a distance by which a vehicle travels after the driver senses danger and applies a brake and before the brake starts working, and a braking distance, which is a distance by which the vehicle travels after the brake starts working and before the vehicle stops. While depending also on a vehicle type, loadage, a state of tires, a state of the road surface, or the like, the stop distance is around 20 m at 40 km per hour, and around 55 m at 80 km per hour, in general. A factor of collision of the vehicle 101 with another vehicle 102 is not always in only the vehicle 101. For example, the vehicle 101 may collide with another vehicle 102 when another vehicle 102 suddenly stops, another vehicle 102 spins, or another vehicle 102 travels in the opposite direction. Further, the vehicle 101 may be involved in an accident caused by one of other vehicles 102 with another of other vehicles 102. It is therefore preferable to ensure a sufficiently long following distance 105 to another vehicle 102 which seems to be of high danger. Accordingly, in the present embodiment, a control unit 202 (see FIG. 2) determines the danger in another vehicle 102 based on images acquired by an imaging unit 201 (see FIG. 2) and, based on the danger in another vehicle 102, generates a signal used for controlling the vehicle 101 so as to reduce danger on the vehicle 101. Specifically, danger in another vehicle 102 is determined based on zigzag driving, lane deviation, or the like occurring in a case of drowsy driving or distracted driving and, based on the determined danger in another vehicle 102, a signal used for controlling the vehicle 101 so as to cause the vehicle 101 to enter a safer state is generated. Thereby, the following distance 105 between the vehicle 101 and another vehicle 102 is ensured sufficiently, for example, and safety of the subject vehicle can be improved.

Figure 2:
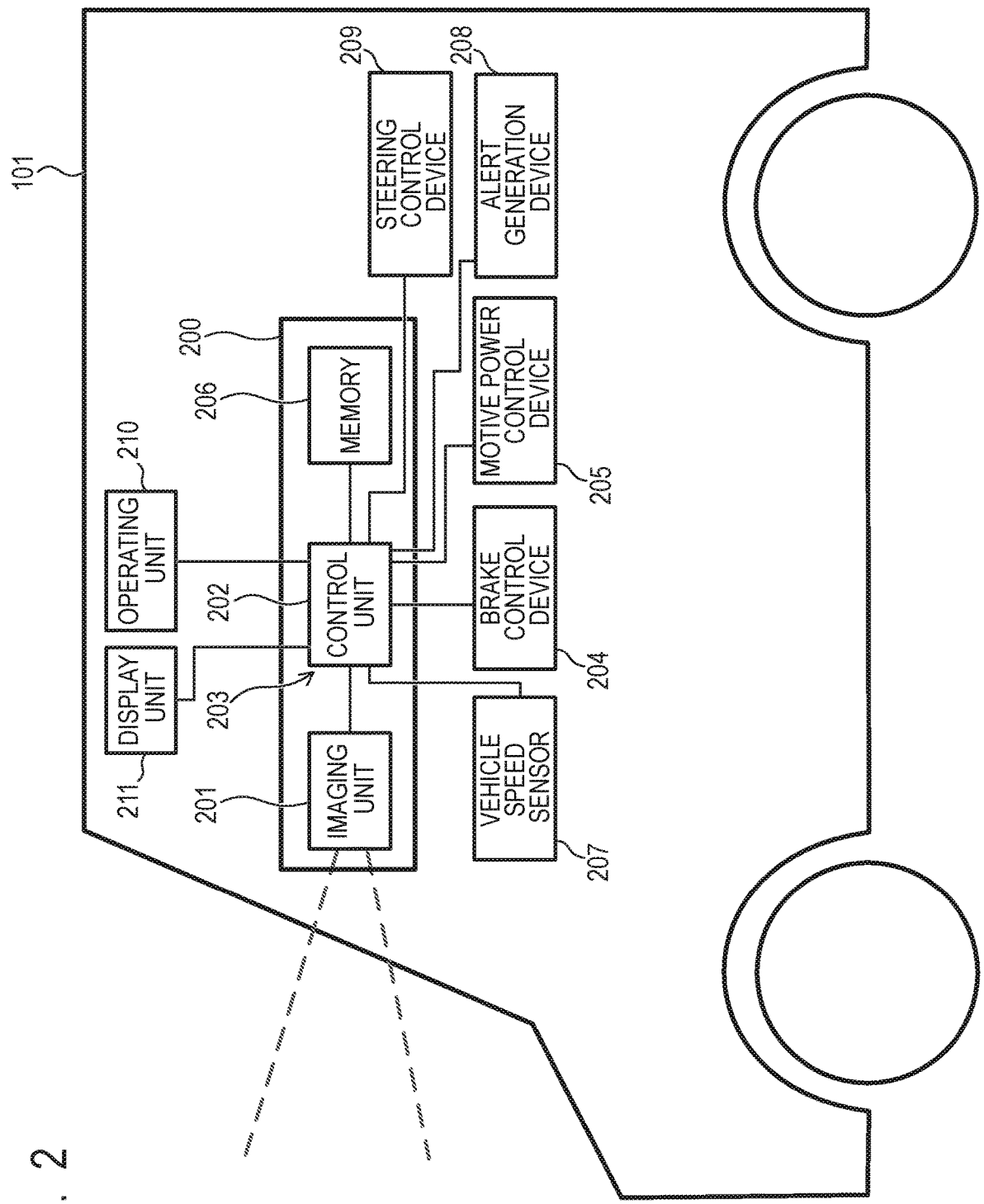
FIG. 2 is a diagram illustrating a control device according to a first embodiment.

FIG. 2 is a schematic diagram illustrating a control device according to the present embodiment. The control device 200) according to the present embodiment is mounted on the vehicle 101. The control device 200 has an imaging unit 201, a control unit 202, and a memory 206. Note that the memory 206 may be provided inside the control unit 202. Further, the imaging unit 201 may be provided separately from the control device 200. Images sequentially acquired by the imaging unit 201 are input to an input unit 203 of the control unit 202.

Further, vehicle speed information output from a vehicle speed sensor 207 provided in the vehicle 101 is input to the input unit 203 of the control unit 202. A control signal used for controlling the vehicle 101 is generated by the control unit 202 as described later. A brake control signal used for causing a brake control device 204 provided in the vehicle 101 to control a brake is generated by the control unit 202. Further, a motive power control signal used for causing a motive power control device 205 provided to the vehicle 101 to control drive power of a motive power source is generated by the control unit 202.

Further, a steering control signal used for causing a steering control device 209 provided in the vehicle 101 to control steering is generated by the control unit 202. When the motive power source of the vehicle 101 is an engine, the motive power control device 205 is an engine control unit (ECU), for example. For example, the control unit 202 can generate a brake control signal so as to cause the brake control device 204 to actuate a brake in order to increase the following distance 105 to another vehicle 102 of high danger. Further, for example, the control unit 202 can generate a motive power control signal so as to cause the motive power control device 205 to suppress the drive power of the motive power source in order to increase the following distance 105 to another vehicle 102 of high danger. Further, the control unit 202 may generate both the brake control signal and the motive power control signal as described above. Note that the brake control device 204 and the motive power control device 205 may be formed of a single device.

Further, for example, the control unit 202 can generate a steering control signal used for causing the steering control device 209 to perform steering control in order to change a traveling lane of the vehicle 101 to a different traveling lane that is different from the traveling lane of another vehicle 102 of high danger. Further, instruction signals used for operating various control devices are input to the control unit 202 from an operating unit 210 including a steering wheel by which the user may send an instruction for steering control, an accelerator pedal and a brake pedal that can provide an instruction of acceleration and deceleration of the vehicle speed, and the like. The control unit 202 enables manual drive by the user by controlling the brake control device 204, the motive power control device 205, and the steering control device 209 based on the input signal. The embodiment is not limited to the above, and may be configured such that a control unit for manual drive may be separately provided.

A display unit 211 is a display device having a liquid crystal display device or the like that displays various information. The display unit 211 displays vehicle speed information or the number of revolutions of the engine, the presence or absence of a brake operation, the presence or absence of various alerts for a dangerous vehicle or the like, an image captured by the imaging unit 201, other monitoring information acquired by various sensors, or the like in accordance with an instruction from the control unit 202.

The imaging unit 201 acquires a plurality of images having a parallax from each other caused by different points of view, that is, parallax images. In the present embodiment, the imaging unit 201 uses an imaging unit having sensitivity to a visible wavelength range. Further, an imaging optical system (a lens unit) is provided in the imaging unit 201, and a first optical image is formed by a light flux passing through a first pupil region of exit pupils of the imaging optical system. Further, a second optical image is formed by a light flux passing through a second pupil region, which is different from the first pupil region, of the exit pupils of the imaging optical system. At this time, there is a parallax between the first optical image and the second optical image. The imaging unit 201 receives light of the first and second optical images by using an imaging element that is a CMOS image sensor. Here, unit pixels are arranged two-dimensionally on an imaging surface of the imaging element of the imaging unit 201, and a first division pixel and a second division pixel are provided in each of the unit pixels. A photoelectric conversion unit is provided in each of the first division pixel and the second division pixel. The imaging optical system is formed such that a light flux which has passed through the first pupil region enters the first division pixel and a light flux which has passed through the second pupil region enters the second division pixel. A first image is generated by signals that are acquired by a plurality of first division pixels, respectively. A second image is generated by signals acquired by a plurality of second division pixels, respectively. Since a parallax (a phase difference) is present between the first optical image and the second optical image, a parallax is present between the first image and the second image. A distance to an object can be calculated from the parallax (the phase difference) between the first image and the second image based on the principle of triangulation. Such a ranging scheme is referred to as an imaging-surface phase difference ranging scheme. Further, based on a signal obtained by composing a signal acquired by the first division pixel and a signal acquired by the second division pixel, the imaging unit 201 may also acquire a composite image that corresponds to a larger portion of a pupil region of the imaging optical system and takes a larger light amount therein. Such a composite image is superior to a parallax image in image quality and thus is used for more precise image analysis or the like.

It is preferable that the imaging unit 201 acquire an image having a resolution so that zigzag driving, lane deviation, or the like of another vehicle 102 can be more reliably detected. For example, it is preferable that the imaging unit 201 be able to acquire an image having a resolution that makes it possible to accurately recognize the position of the rear end of the preceding vehicle 102a, the positions of tires 114 of the preceding vehicle 102a, the position of a mark such as a white line defining a traveling lane, or the like. The size of the imaging element, the number of pixels of the imaging element, a magnification of the imaging optical system, or the like is suitably set so that the recognition of the above is enabled at the longest distance at which the recognition of the above is necessary. For example, when it is daytime, a sunlight may be a light source used for capturing the preceding vehicle 102a or the like. Further, when it is inside a tunnel, lamps installed in the tunnel may be a light source used for capturing the preceding vehicle 102a or the like. When it is nighttime or in an environment of insufficient lighting, a headlight or the like installed to the vehicle 101 may be a light source used for capturing the preceding vehicle 102a or the like.

The imaging unit 201 sequentially transmits images obtained by capturing to the control unit 202. In the present embodiment, unless otherwise instructed in particular, the imaging unit 201 performs capturing at a predetermined time interval (frequency) and sequentially acquires images including another vehicle 102 as a subject. Such a predetermined time interval is not particularly limited and may be around 0.1 second, for example. In such a case, for example, 10 sets of parallax images per 1 second will be input to the control unit 202.

Further, another vehicle 102 may be located in various directions relative to the vehicle 101. For example, another vehicle 102 may be located in front of the vehicle 101, or another vehicle 102 may be located diagonally in front of the vehicle 101, or another vehicle 102 may be located side by side with the vehicle 101. Further, another vehicle 102 may be located diagonally behind the vehicle 101, or another vehicle 102 may be located behind the vehicle 101. That is, it is preferable that the imaging unit 201 be able to acquire images in various directions. Accordingly, the imaging unit 201 of the present embodiment includes a camera having a wide-angle lens with a view angle of 180 degrees including the forward area of the vehicle 101 and a camera having a wide-angle lens with a view angle of 180 degrees including the backward area of the vehicle 101 and can capture a subject in every direction on a horizontal plane. Without being limited to the embodiment described above, while the number of imaging units 201 will be small when a wide-angle lens is used, a large number of imaging units 201 are required to be provided when no wide-angle lens is used. Further, with a use of an ultra-wide-angle lens, a single imaging unit 201 is possible, and the present invention is applicable as long as the imaging unit 201 is configured to be able to view another vehicle in a plurality of directions.

The control unit (processing unit) 202 is responsible for the entire control of the control device 200. The control unit 202 is provided with a central processing unit (CPU) or the like and can perform various processes such as a calculation process. The control unit 202 stores an image input from the imaging unit 201 in the memory 206. The memory 206 may be formed of a dynamic random access memory (DRAM), a flash memory, or the like, for example. The control unit 202 has an image analysis function in order to determine information regarding danger in another vehicle 102, a distance to another vehicle 102, or the like from the image acquired by the imaging unit 201. For example, the control unit 202 can recognize a mark such as a white line defining a traveling lane or another vehicle 102 from the image acquired by the imaging unit 201. Further, for example, the control unit 202 can recognize a guardrail, a utility pole, a pedestrian, or the like from the image acquired by the imaging unit 201. A known method may be used for the above image recognition process, and a matching process for storing in advance a feature amount such as brightness, a color, a shape, or the like associated with each subject in a memory and determine a subject by comparison with the feature amount, a process for recognizing a subject from a motion vector obtained between a plurality of images, or the like can be applied. Further, for example, as for a method using learning represented by a neural network or a support vector machine, the control unit 202 can be configured to learn an image that is expected to be acquired by the imaging unit 201 and output information on a recognized subject as the entire image being the input.

Further, the control unit 202 calculates the distance 105 from the vehicle 101 to another vehicle 102 based on a parallax amount in the parallax images acquired by the imaging unit 201. The control unit 202 measures the distance to another vehicle 102 based on images of another vehicle 102 sequentially acquired by the imaging unit 201 and determines the danger in the another vehicle. The control unit 202 may perform determination of the distance 105 to another vehicle 102 of interest or the danger in the another vehicle 102 on all the other vehicles 102 included in the sequentially acquired images or may perform such determination on only particular another vehicle 102. Further, the control unit 202 detects the speed of the vehicle 101 based on vehicle speed information on the vehicle 101 output from the vehicle speed sensor 207.

The control unit 202 determines whether or not there is zigzag driving or lane deviation of the preceding vehicle 102a as described below based on images sequentially acquired by the imaging unit 201. That is, the control unit 202 recognizes the position of the preceding vehicle 102a and the position of a traveling lane on which the preceding vehicle 102a of interest is traveling by using a known image analysis scheme such as edge detection, pattern matching, or the like based on an image in which the preceding vehicle 102a is captured. Furthermore, the control unit 202 may recognize not only the entire position of the preceding vehicle 102a but also the positions of both sides of the preceding vehicle 102a. Further, the control unit 202 may also recognize the positions of white lines or the like marked on both sides of the traveling lane. By performing analysis over a plurality of frames, the control unit 202 detects a frequency at which the preceding vehicle 102a comes close to the white lines marked on both sides of the traveling lane or the like, motion in which the preceding vehicle 102a comes close to the white lines on both sides of traveling lane alternately, or the like and may detect zigzag driving based on the detection result. Further, the control unit 202 may detect lane deviation based on motion in which a part of the preceding vehicle 102a is located on the white line marked on each side of the traveling lane or the like. Further, the control unit 202 may recognize the position of the tire 114 of the preceding vehicle 102a. In such a case, the control unit 202 may detect lane deviation based on motion in which the tire 114 of the preceding vehicle 102a steps on or steps over the white line or the like marked on each side of the traveling lane. A line marked on each side of a traveling lane may include, for example, the roadway center line 103, the vehicular lane boundary 104, a vehicular line outermost line (not illustrated), or the like. Even when there is transient zigzag driving or lane deviation due to a sudden lateral wind, passing by a large vehicle, or the like, the danger in another vehicle 102 is not high. On the other hand, when the frequency of zigzag driving or lane deviation is high or when zigzag driving or lane deviation continues for a long period, the danger in another vehicle 102 is likely to be high. Therefore, the control unit 202 counts not only whether or not there is zigzag driving or lane deviation but also various analysis results over a plurality of frames by using a counter and thereby determines the danger in another vehicle 102 based also on the frequency or the like of zigzag driving or lane deviation. The counter used for counting an occurrence frequency of a determination item of various danger is reset in response to the count being not updated (not additionally counted) for a predetermined period or a predetermined number of times. Note that lane deviation of another vehicle 102 may occur also in a lane change or the like performed intentionally by the driver of another vehicle 102. Thus, the control unit 202 may determine whether or not the lane deviation or the like is caused by a lane change or the like by analyzing indication of a direction indicator based on images. When lane deviation or the like occurs due to a lane change or the like, the lane deviation may be ignored (may not be counted by the counter) in the determination of the danger.

When the danger in the preceding vehicle 102a is high, it is preferable to increase the following distance 105a between the vehicle 101 and the preceding vehicle 102a sufficiently. On the other hand, when the danger in the preceding vehicle 102a is low, the following distance 105a between the vehicle 101 and the preceding vehicle 102a may be set to be the same as a stopping distance estimated from the traveling speed of the vehicle 101, for example. The control unit 202 generates a signal used for controlling the vehicle 101 based on a distance from the vehicle 101 to another vehicle 102, the danger in the another vehicle 102, and a stopping distance estimated from the traveling speed of the vehicle 101. That is, the control unit 202 generates a signal used for suitably ensuring the following distance 105 between the vehicle 101 and another vehicle 102. Specifically, the control unit 202 generates a signal used for controlling the brake control device 204 and a signal used for controlling the motive power control device 205 based on the distance 105 from the vehicle 101 to another vehicle 102, the danger in the another vehicle 102, and the traveling speed of the vehicle 101. These generated signals are then transmitted to the brake control device 204 or the motive power control device 205, respectively.

For example, when the following distance 105a between the vehicle 101 and the preceding vehicle 102a is not necessarily, sufficiently ensured even when the preceding vehicle 102a is a vehicle of high danger that is repeating zigzag driving, lane deviation, or the like, the control unit 202 may generate a signal as described below. That is, in such a case, the control unit 202 generates a signal that causes the brake control device 204 to activate a brake and transmits the generated signal to the brake control device 204. Further, in such a case, the control unit 202 generates a signal that causes the motive power control device 205 to suppress the drive power of the motive power source and transmits the generated signal to the motive power control device 205. Thereby, the traveling speed of the vehicle 101 decreases, and the following distance 105a between the preceding vehicle 102a of high danger and the vehicle 101 is sufficiently ensured.

For example, when the danger in the preceding vehicle 102a is high, the following distance 105a between the vehicle 101 and the preceding vehicle 102a may be set to be twice the stopping distance estimated from the traveling speed of the vehicle 101, for example. On the other hand, when the danger in the preceding vehicle 102a is low, the following distance 105a between the vehicle 101 and the preceding vehicle 102a may be set to be the same as the stopping distance estimated from the traveling speed of the vehicle 101. For example, when the following distance 105a between the vehicle 101 and the preceding vehicle 102a is excessively long even when the danger in the preceding vehicle 102a is low, the control unit 202 may generate a signal as described below. That is, in such a case, the control unit 202 generates a signal that causes the brake control device 204 to release a braking operation and transmits the generated signal to the brake control device 204. Further, in such a case, the control unit 202 generates a signal that causes the motive power control device 205 to increase the drive power of the motive power source and transmits the generated signal to the motive power control device 205.

Note that, while the description is provided here by focusing on the vehicle 101 and the preceding vehicle 102a for simplified illustration, the embodiment is not limited thereto. The control unit 202 may generate a signal used for controlling the vehicle 101 based on the danger in any other vehicles 102 other than the vehicle 101. For example, a signal used for controlling the vehicle 101 may be generated based on the danger in another vehicle 102d traveling in a diagonal forward area of the vehicle 101 and the distance 105d to the another vehicle 102d. Further, in a case such as when the danger in another vehicle 102 is high or the possibility of collision with another vehicle 102 is high, the control unit 202 may issue an alert by using an alert generation device 208 provided in the vehicle 101. As the alert generation device 208, such an alert generation device that causes a seat belt, a steering, a seat, or the like to vibrate or the like may be used, for example. Note that the alert generation device 208 is not limited to the above. For example, an alert may be displayed on a display screen or the like of an instrumental panel or a car navigation system corresponding to the display unit 211. Further, an alert may be displayed on the display screen, and an alert may be provided by a voice or the like. Thereby, it is possible to call attention of the driver of the vehicle 101.

Figure 3:
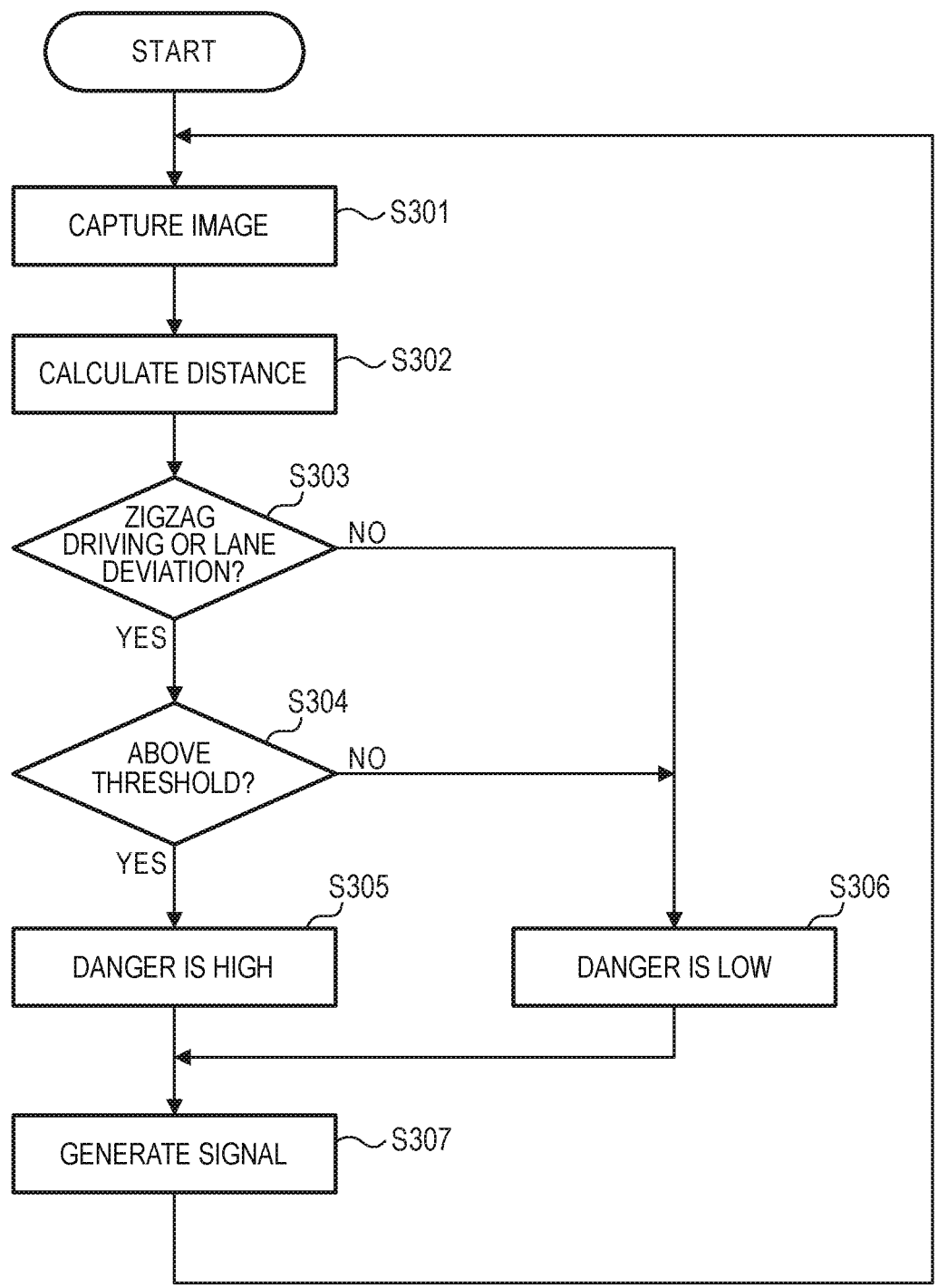
FIG. 3 is a flowchart illustrating an operation of the control device according to the first embodiment.

FIG. 3 is a flowchart illustrating the operation of the control device 200 according to the present embodiment. This operation starts in response to the start of traveling of the vehicle 101 (for example, vehicle speed information or information regarding a brake) as a trigger. The start timing of the operation is not limited to the above, the operation may be started at any timing in accordance with a setting by a user operation to the operating unit 210 (including a setting of a trigger itself such as the vehicle speed or detection of another vehicle 102), for example.

In step S301, capturing is performed by the imaging unit 201. Images acquired by the imaging unit 201 are input to the control unit 202.

In step S302, the control unit 202 detects another vehicle 102 based on the image acquired by the imaging unit 201 and calculates the distance 105 from the vehicle 101 to another vehicle 102 by the method described above.

In step S303, the control unit 202 determines whether or not another vehicle 102 drives in a zigzag or deviates from a lane by using the method described above based on the images acquired by the imaging unit 201. If it is determined that another vehicle 102 drives in a zigzag or deviates from a lane (step S303, YES), the process proceeds to step S304. On the other hand, if it is determined that another vehicle 102 neither drives in a zigzag nor deviates from a lane (step S303, NO), the process proceeds to step S306.

In step S304, the control unit 202 determines whether or not the frequency of zigzag driving or lane deviation of another vehicle 102 is greater than or equal to a threshold. If the frequency of zigzag driving or lane deviation of another vehicle 102 is greater than or equal to the threshold (step S304, YES), the process proceeds to step S305. On the other hand, if the frequency of zigzag driving or lane deviation of another vehicle 102 is less than the threshold (step S304, NO), the process proceeds to step S306. Further, steps S303 and S304 may be collected to determine whether or not zigzag driving or lane deviation is detected at a frequency above a threshold. Further, the threshold may be any value above one, and it may be determined that the danger is high if zigzag driving or lane deviation is detected at least once, for example, when a high threshold (of a deviation distance or the like) for determining zigzag driving or lane deviation is set or the like.

In step S305, the control unit 202 determines that the danger in another vehicle 102 is high. The process then proceeds to step S307.

In step S306, the control unit 202 determines that the danger in another vehicle 102 is low. The process then proceeds to step S307.

In step S307, the control unit 202 generates a signal used for controlling the vehicle 101 based on the distance 105 from the vehicle 101 to another vehicle 102, the danger in the another vehicle 102, and the traveling speed of the vehicle 101. As described above, the distance 105 from the vehicle 101 to another vehicle 102 is sequentially measured based on images from the imaging unit 201, and the traveling speed of the vehicle 101 is also sequentially measured by the vehicle speed sensor 207. For example, when the following distance 105a between the vehicle 101 and the preceding vehicle 102a is not sufficiently ensured even when the preceding vehicle 102a is a vehicle of high danger, the control unit 202 may generate a signal as described below. For example, a signal for controlling the vehicle 101 so that the following distance 105 between the vehicle 101 and another vehicle 102 becomes longer than or equal to a first distance, for example, is generated. The first distance is around twice the stopping distance estimated from the traveling speed of the vehicle 101, for example. Specifically, the control unit 202 generates a signal that causes the brake control device 204 to perform a brake operation and transmits the generated signal to the brake control device 204. Further, the control unit 202 generates a signal that causes the motive power control device 205 to reduce the drive power of the motive power source and transmits the generated signal to the motive power control device 205. Thereby, the traveling speed of the vehicle 101 decreases, and the following distance 105a between the vehicle 101 and another vehicle 102 is ensured to be the first distance or longer, for example. On the other hand, for example, the following distance 105a between the vehicle 101 and another vehicle 102 is excessively large, the control unit 202 may generate a signal as described below. For example, a signal for controlling the vehicle 101 so that the following distance 105 between the vehicle 101 and another vehicle 102 becomes a third distance that is shorter than a second distance, for example, is generated. The third distance may be around twice the stopping distance estimated from the traveling speed of the vehicle 101, for example. Specifically, the control unit 202 generates a signal that causes the brake control device 204 to release the brake operation and transmits the generated signal to the brake control device 204. Further, the control unit 202 generates a signal that causes the motive power control device 205 to increase the drive power of the motive power source and transmits the generated signal to the motive power control device 205. Thereby, the traveling speed of the vehicle 101 increases, and the following distance 105a between the vehicle 101 and the preceding vehicle 102a becomes the third distance, for example. Then, operations of step S301 and subsequent steps are repeated. Further, a series of operations above of the control device 200 illustrated in FIG. 3 ends in response to the speed of the vehicle 101 decreasing below a predetermined speed, stop of the engine, or the like.

Note that, while the case where it is determined whether the danger in another vehicle 102 is high or low is described as an example in the flow of FIG. 3, the present invention is not limited thereto. For example, the danger in another vehicle 102 may be determined more finely. For example, the level (degree) of danger, that is, the danger degree may be determined based on the frequency or the like of zigzag driving or lane deviation, for example. A plurality of thresholds may be set, and the level of danger may be determined in multiple steps based on which threshold the frequency of zigzag driving or lane deviation is above. For example, if the frequency of zigzag driving or lane deviation of another vehicle 102 is higher than or equal to a first threshold TH1, it may be determined that the level of danger in the another vehicle 102 is 3. Further, if the frequency of zigzag driving or lane deviation is higher than or equal to a second threshold TH2, which is lower than the first threshold TH1, and lower than the first threshold TH1, it may be determined that the level of danger in the another vehicle 102 is 2. Further, if the frequency of zigzag driving or lane deviation of another vehicle 102 is lower than the second threshold TH2 or when another vehicle 102 neither drives in a zigzag nor deviates a lane, it may be determined that the level of danger in the another vehicle 102 is 1. Note that, for example, the level of danger is higher as the numerical value is larger in this example.

Further, while the case where the control unit 202 generates a signal in step S307 for both the cases of a high degree of danger and a low degree of danger in another vehicle 102 has been described above as an example, the embodiment is not limited thereto. For example, the control unit 202 may generate a signal in step S307 only when the degree of danger in another vehicle 102 is high. In such a case, after the completion of step S306, the process returns to step S301 without performing step S307.

Figure 4:
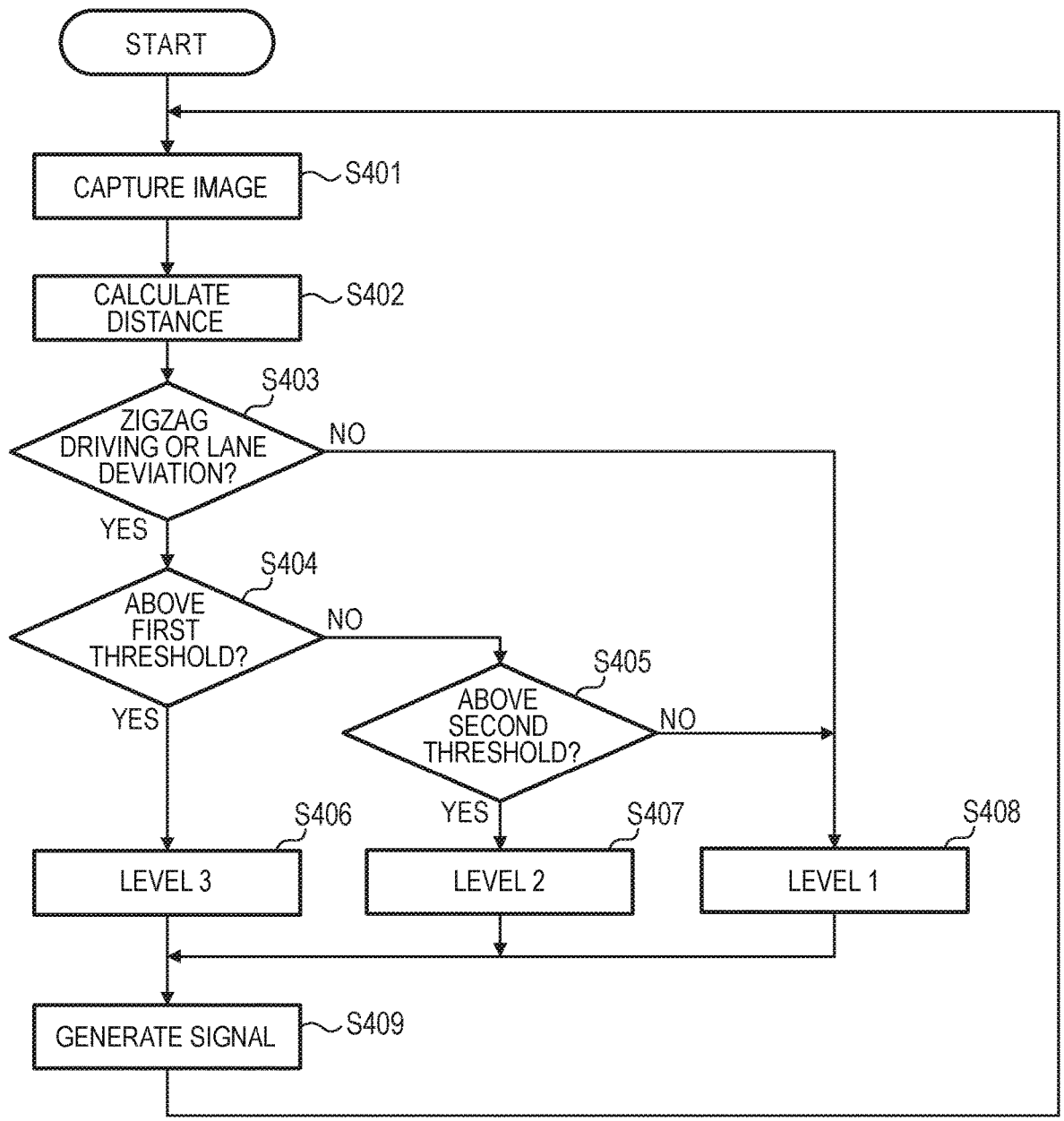
FIG. 4 is a flowchart illustrating another example of an operation of the control device according to the first embodiment.

FIG. 4 is a flowchart illustrating another example of the operation of the control device 200 according to the present embodiment.

Since steps S401 to S404 are the same as steps S301 to S304 described above by using FIG. 3, the description thereof will be omitted. If another vehicle 102 drives in a zigzag or deviates from a lane (step S403, YES), the process proceeds to steps S404. On the other hand, if another vehicle 102 neither drives in a zigzag nor deviates from a lane (step S403, NO), the process proceeds to steps S408.

In step S404, the control unit 202 determines whether or not the frequency of zigzag driving or lane deviation of another vehicle 102 is higher than or equal to the first threshold TH1. If the frequency of zigzag driving or lane deviation of another vehicle 102 is higher than or equal to the first threshold TH1 (step S404, YES), the process proceeds to step S406. On the other hand, if the frequency of zigzag driving or lane deviation of another vehicle 102 is lower than the first threshold TH (step S404. NO), the process proceeds to step S405.

In step S405, the control unit 202 determines whether or not the frequency of zigzag driving or lane deviation of another vehicle 102 is higher than or equal to the second threshold TH2. The second threshold TH2 is lower than the first threshold TH1. If the frequency of zigzag driving or lane deviation of another vehicle 102 is higher than or equal to the second threshold TH2 (step S405, YES), the process proceeds to step S407. On the other hand, if the frequency of zigzag driving or lane deviation of another vehicle 102 is lower than the second threshold TH2 (step S405. NO), the process proceeds to step S408.

In step S406, the control unit 202 determines that the level of danger in another vehicle 102 is 3. The process then proceeds to step S409.

In step S407, the control unit 202 determines that the level of danger in another vehicle 102 is 2. The process then proceeds to step S409.

In step S408, the control unit 202 determines that the level of danger in another vehicle 102 is 1. The process then proceeds to step S409.

In step S409, the control unit 202 generates a signal used for controlling the vehicle 101 based on the distance 105 from the vehicle 101 to another vehicle 102, the danger in the another vehicle 102, and the traveling speed of the vehicle 101. As described above, the distance 105 from the vehicle 101 to another vehicle 102 is sequentially measured based on images from the imaging unit 201, and the traveling speed of the vehicle 101 is also sequentially measured by the vehicle speed sensor 207. When a signal for controlling the vehicle 101 is generated, the level of danger in another vehicle 102 is considered.

When the vehicle 101 is traveling with a distance to another vehicle 102, where the distance is sufficiently longer than the stopping distance estimated from the traveling speed (longer than or equal to a threshold), for example, when the level of danger in another vehicle 102 is 3, a signal for controlling the vehicle 101 that causes the following distance 105 between the vehicle 101 and another vehicle 102 to be longer than or equal to a first distance is generated. The first distance may be, for example, three times the stopping distance estimated from the traveling speed of the vehicle 101. Further, when the level of danger in another vehicle 102 is 2, a signal for controlling the vehicle 101 that causes the following distance 105 between the vehicle 101 and another vehicle 102 to be longer than or equal to a second distance, which is shorter than the first distance, is generated. The second distance may be, for example, twice the stopping distance estimated from the traveling speed of the vehicle 101. Further, when the level of danger in another vehicle 102 is 1, a signal for controlling the vehicle 101 that causes the following distance 105 between the vehicle 101 and another vehicle 102 to be longer than or equal to a third distance, which is shorter than the second distance, is generated. The third distance may be, for example, the same as the stopping distance estimated from the traveling speed of the vehicle 101. In such a way, a signal for controlling the vehicle 101 is generated based on the danger in another vehicle 102. Then, operations of step S401 and subsequent steps are repeated.

On the other hand, when the vehicle 101 is traveling with a distance to another vehicle 102 or slightly distant from another vehicle 102, where the distance is shorter than the stopping distance estimated from the traveling speed (shorter than the threshold), a control signal for increasing the following distance 105 may be generated regardless of the presence or absence of the danger in another vehicle 102. That is, the control unit 202 generates a signal that causes the brake control device 204 to perform a brake operation and transmits the generated signal to the brake control device 204. Further, the control unit 202 generates a signal that causes the motive power control device 205 to reduce the drive power of the motive power source and transmits the generated signal to the motive power control device 205.

Note that, while the case where the control unit 202 generates a signal in step S409 for all the cases of the level of the danger in another vehicle 102 being 3, 2, and 1 has been described above as an example, the embodiment is not limited thereto. For example, the control unit 202 may generate a signal in step S409 only when the level of danger in another vehicle 102 is 3 or 2. In such a case, after the completion of step S408, the process returns to step S401 without performing step S409.

As described above, according to the present embodiment, the danger in another vehicle 102 is determined based on images sequentially acquired by the imaging unit 201. Specifically, the danger in another vehicle 102 is determined based on the presence or absence or frequency of zigzag driving occurring in a case of drowsy driving or distracted driving. A signal for controlling the vehicle 101 is then generated based on the danger in another vehicle 102 of interest. Thus, according to the present embodiment, safety of the vehicle 101 can be improved.

Figure 5:
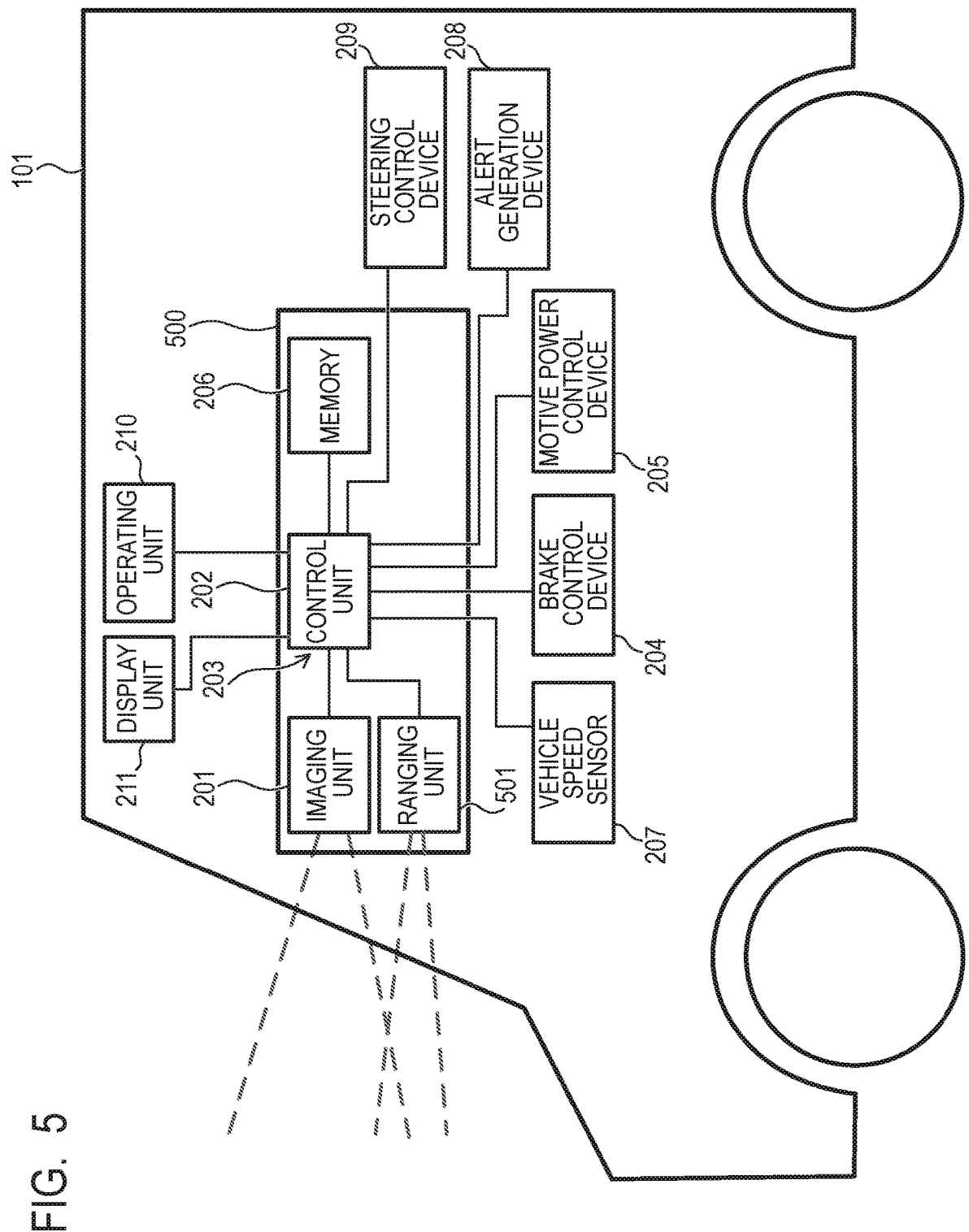
FIG. 5 is a diagram illustrating a control device according to a second embodiment.

FIG. 5 illustrates another example of the control device of the present embodiment. A control device 500 is mounted on the vehicle 101. The control device 500 has the imaging unit 201, the control unit 202, the memory 206, and a ranging unit 501.

The imaging unit 201 transmits images sequentially obtained by capturing to the control unit 202. In the present example, since it is possible to measure the distance 105 from the vehicle 101 to another vehicle 102 by using the ranging unit 501, the imaging unit 201 is not required to acquire parallax images. In this example, a case where images acquired by the imaging unit 201 are not parallax images will be described as an example.

The ranging unit 501 always measures the distance 105 from the vehicle 101 to another vehicle 102 and transmits the measured distance 105 to the control unit 202. As the ranging unit 501, a Time Of Flight (TOF) sensor, a millimeter-wave radar, or the like may be used, for example. The millimeter-wave radar is preferable because the ranging accuracy to a distant object is high and is robust against a bad weather or the like compared to a scheme of determining a distance to an object by using a light. As described above, since another vehicle 102 may be located in various directions to the vehicle 101, the ranging unit 501 is required to measure the distance to another vehicle 102 that may be located in various directions. When a ranging device having a wide observation range is used, the number of ranging devices forming the ranging unit 501 can be small, however, when a ranging device having a narrow observation range is used, a large number of ranging devices forming the ranging unit 501 are required to be provided. Further, when the ranging unit 501 is provided separately from the imaging unit 201 as illustrated in FIG. 5, steps S302 and S402 of FIG. 3 and FIG. 4 will be a detection step in which the control unit 202 acquires distance information detected by the ranging unit 501.

Second Embodiment

A control device and a control method according to a second embodiment will be described by using the drawings. The same components as those in the control device and the control method according to the first embodiment illustrated in FIG. 1 to FIG. 5 are labeled with the same references, and the description thereof will be omitted or simplified. The present embodiment is also applicable to any of the vehicles 101 illustrated in FIG. 2 and FIG. 5. A case of application to the vehicle 101 illustrated as an example in FIG. 2 will be described below in the present embodiment.

It is expected that an accident is more likely to occur when the driver of another vehicle 102 is a beginner than when the driver of another vehicle 102 is an experienced driver. Further, it is expected that an accident is more likely to occur when the driver of another vehicle 102 is an elderly person than when the driver of another vehicle 102 is not an elderly person. Accordingly, in the present embodiment, danger in another vehicle 102 is determined by focusing on whether or not the driver of another vehicle 102 is a beginner or an elderly person, and a sufficient following distance 105 is ensured for another vehicle 102 of high danger.

In the present embodiment, the control unit 202 in the vehicle 101 determines the danger in another vehicle 102 by identifying a driver based on an image of another vehicle 102 acquired by the imaging unit 201. The control unit 202 determines whether or not the driver of another vehicle 102 is a driver of high danger based on an image acquired by the imaging unit 201.

Figure 6:
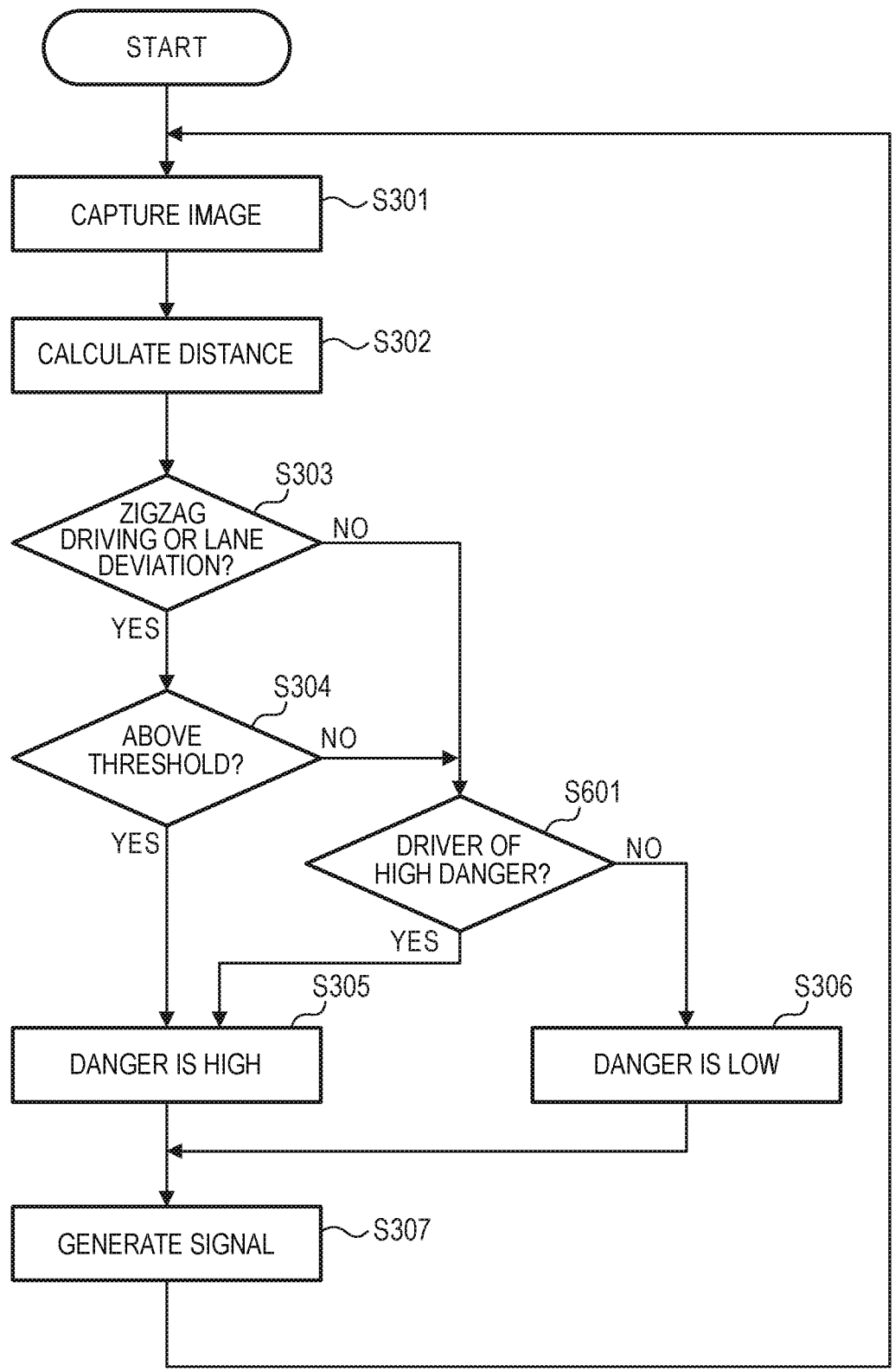
FIG. 6 is a flowchart illustrating an operation of the control device according to the second embodiment.

FIG. 6 is a flowchart illustrating the operation of the control device 200 according to the present embodiment. The same flow as that in FIG. 3 is labeled with the same number, and the description thereof will be omitted. In the present embodiment, even if it is determined that there is no zigzag driving or lane deviation or the frequency thereof is less than the threshold in step S303 or S304, it is determined that the danger in another vehicle 102 is high if it is determined that the danger in a driver is high in step S601.

If NO is determined by the control unit 202 in step S303 or step S304 of FIG. 6, the process proceeds to step S601. In step S601, it is determined whether or not the driver is a driver of high danger based on an image acquired by the imaging unit 201. Specifically, based on an image acquired by the imaging unit 201, the control unit 202 determines whether or not a label indicating the status of the driver such as a label of a newly-licensed driver or a label of an elderly driver is attached to another vehicle 102, for example. In addition to the above, a label indicating that an automatic driving function is equipped, a label indicating an automatic driving level, a label indicating an unmanned driving vehicle, or the like may be considered as a label. The control unit 202 stores images of the label of a newly-licensed driver, the label of an elderly driver, and other labels in a database in advance. Such a database is stored in the memory 206, for example. While using such a database, the control unit 202 determines whether or not the label of a newly-licensed driver or the label of an elderly driver is attached to another vehicle 102 by using a scheme of pattern matching or the like.

When it is determined that a label of a newly-licensed driver or a label of an elderly driver is attached to another vehicle 102, the control unit 202 determines that the driver of another vehicle 102 is a driver of high danger and thus the danger in the another vehicle 102 is high. On the other hand, when it is determined that a label indicating a vehicle equipped with an automatic driving function, a label indicating an automatic driving level, or a label indicating an unmanned driving vehicle is attached, it is determined that the driver of another vehicle 102 is not a driver of high danger and thus the danger in the another vehicle 102 is not high. Here, when the automatic driving level is lower than a predetermined level, when it is considered from an external factor that a road, a condition, or the like is dangerous for an unmanned driving vehicle, or the like, it may be determined that there is another vehicle of high danger when such a label is recognized.

Note that, while it is determined whether or not the driver is of high danger by determining whether or not the driver of another vehicle 102 is a beginner or an elderly person based on the label 110 such as a label of a newly-licensed driver, a label of an elderly driver, or the like, a determination scheme or a determination item is not limited thereto. For example, when another vehicle 102 is located side by side with the vehicle 101, the imaging unit 201 may be able to capture the driver such as a face of the driver of another vehicle 102. Human body information such as an appearance, pulses, or the like, an age, a health condition, or the like can be estimated from the image of the driver. For example, when the hair of a driver is white/gray or when the face of a driver has many wrinkles, the driver may be estimated as an elderly person. In such a way, a known technology or the like that can determine the age of a person from an image of a face or the like of the person may be used to determine whether or not the driver is an elderly person or a young person. In such a case, even when neither the label of an elderly driver nor the label of a newly-licensed driver is attached to another vehicle 102, it is possible to determine that the driver of the another vehicle 102 of interest is an elderly person or a beginner. Indeed, a beginner does not always have a young appearance, and an elderly person does not always have an aged appearance. Further, a young person is not always a beginner. In view of suppressing an accident, however, it is preferable to estimate slightly higher danger than the actual danger. As discussed above, the danger in another vehicle 102 may be determined based on an image of the driver of the another vehicle 102.

Furthermore, the determination item of danger in a driver is not limited to ages. When images of the driver of another vehicle 102 can be acquired as described above, the danger is determined by analyzing the face orientation or a line of sight, the interval of blinking, the motion, or the posture of the driver and detecting whether or not the driver is looking aside, drowsing, operating another device, or normally performing driving. Further, information on whether or not there is a driver of high danger that is always transmitted from another vehicle 102, a manufacturer, or a public institution may be externally acquired.

For example, another vehicle may have a driver monitoring scheme that monitors the driver drowsing or looking aside. As a driver monitoring scheme, the danger is determined by acquiring a moving image of the upper part of the driver's body, analyzing the face orientation or the line of sight, the interval of blinking, the motion, or the posture of the driver, and detecting whether or not the driver is looking aside, drowsing, operating another device, or normally performing driving. Since a vehicle interior is dark and it is preferable not to disturb the driver, the determination may be made by using a near-infrared image acquired by a lighting unit of a near-infrared ray, which is a non-visible light, and an imaging device that can acquire the near-infrared ray. The driver monitoring scheme other than the use of a moving image may be to use another vehicle equipped with a sensor using a static capacitance or a temperature embedded in a steering wheel in order to determine whether or not the steering wheel is gripped. Further, to determine whether or not the driver is sitting on a driver seat correctly, another vehicle equipped with a sensor using a temperature or a pressure may be used. When another vehicle determines by itself the danger in the driver in accordance with an analysis result of the above sensor information and an analysis result of a moving image described above and transmits determination information on the danger to a nearby vehicle or a server, the danger in the another vehicle can be determined by receiving the determination information. That is, the vehicle 101, which is a subject vehicle, detects whether or not there is a vehicle driven by a driver of high danger around the vehicle 101 by communicating with a center responsible for traffic information, acquires the position of such a vehicle, and associates the danger in another vehicle 102.

Further, as a determination circuit for determining danger in a driver from images of the driver, a processor storing a trained program that has learned images having various patterns for the face orientation, the line of sight, the motion, and the posture of a driver by using machine learning in advance may be used. When an image of a driver is input to the determination circuit, a result of detection as to whether or not the driver is looking aside, drowsing, operating another device, normally performing driving, or the like is output as information on the driver.

In step S307 the control unit 202 generates a signal used for controlling the vehicle 101 based on the distance 105 from the vehicle 101 to another vehicle 102, the danger in the another vehicle 102, and the traveling speed of the vehicle 101. As described above, the distance 105 from the vehicle 101 to another vehicle 102 is sequentially measured based on images from the imaging unit 201, and the traveling speed of the vehicle 101 is also sequentially measured by the vehicle speed sensor 207. For example, when the following distance 105a between the vehicle 101 and the preceding vehicle 102a is not sufficiently ensured even when the preceding vehicle 102a is a vehicle of high danger, the control unit 202 may generate a signal as described below. For example, a signal for controlling the vehicle 101 so that the following distance 105 between the vehicle 101 and another vehicle 102 is longer than or equal to a first distance, for example, is generated. The first distance is around twice a stopping distance estimated from the traveling speed of the vehicle 101, for example. Specifically, the control unit 202 generates a signal that causes the brake control device 204 to perform a brake operation and transmits the generated signal to the brake control device 204. Further, the control unit 202 generates a signal that causes the motive power control device 205 to reduce the drive power of the motive power source and transmits the generated signal to the motive power control device 205. Thereby, the traveling speed of the vehicle 101 decreases, and the following distance 105a between the vehicle 101 and another vehicle 102 is ensured to be the first distance or longer, for example. On the other hand, for example, when the following distance 105a between the vehicle 101 and another vehicle 102 is excessively large, the control unit 202 may generate a signal as described below. For example, a signal for controlling the vehicle 101 so that the following distance 105 between the vehicle 101 and another vehicle 102 becomes a third distance that is shorter than a second distance, for example, is generated. The third distance may be around twice the stopping distance estimated from the traveling speed of the vehicle 101, for example. Specifically, the control unit 202 generates a signal that causes the brake control device 204 to release the brake operation and transmits the generated signal to the brake control device 204. Further, the control unit 202 generates a signal that causes the motive power control device 205 to increase the drive power of the motive power source and transmits the generated signal to the motive power control device 205. Thereby, the traveling speed of the vehicle 101 increases, and the following distance 105a between the vehicle 101 and the preceding vehicle 102a becomes the third distance, for example. Then, operations of step S301 and subsequent steps are repeated. Further, a series of operations above of the control device 200 illustrated in FIG. 6 ends in response to the speed of the vehicle 101 decreasing below a predetermined speed, stop of the engine, or the like.

Note that, while the case where the control unit 202 generates a signal in step S307 for both the cases of a high degree of danger and a low degree of danger in another vehicle 102 has been described above as an example, the embodiment is not limited thereto. For example, the control unit 202 may generate a signal in step S307 only when the degree of danger in another vehicle 102 is high. In such a case, after the completion of step S306, the process returns to step S301 without performing step S307.

As described above, in the present embodiment, the danger in another vehicle 102 is determined more accurately based on the images acquired by the imaging unit 201 than in the first embodiment. Specifically, the danger in another vehicle 102 is determined based not only on the driving status of another vehicle 102 but also whether or not the driver of another vehicle 102 is a driver of high danger. A signal for controlling the vehicle 101 is then generated based on the danger in the another vehicle 102. Thus, according to the present embodiment, safety of the vehicle 101 can be further improved.

Third Embodiment

Figure 7:
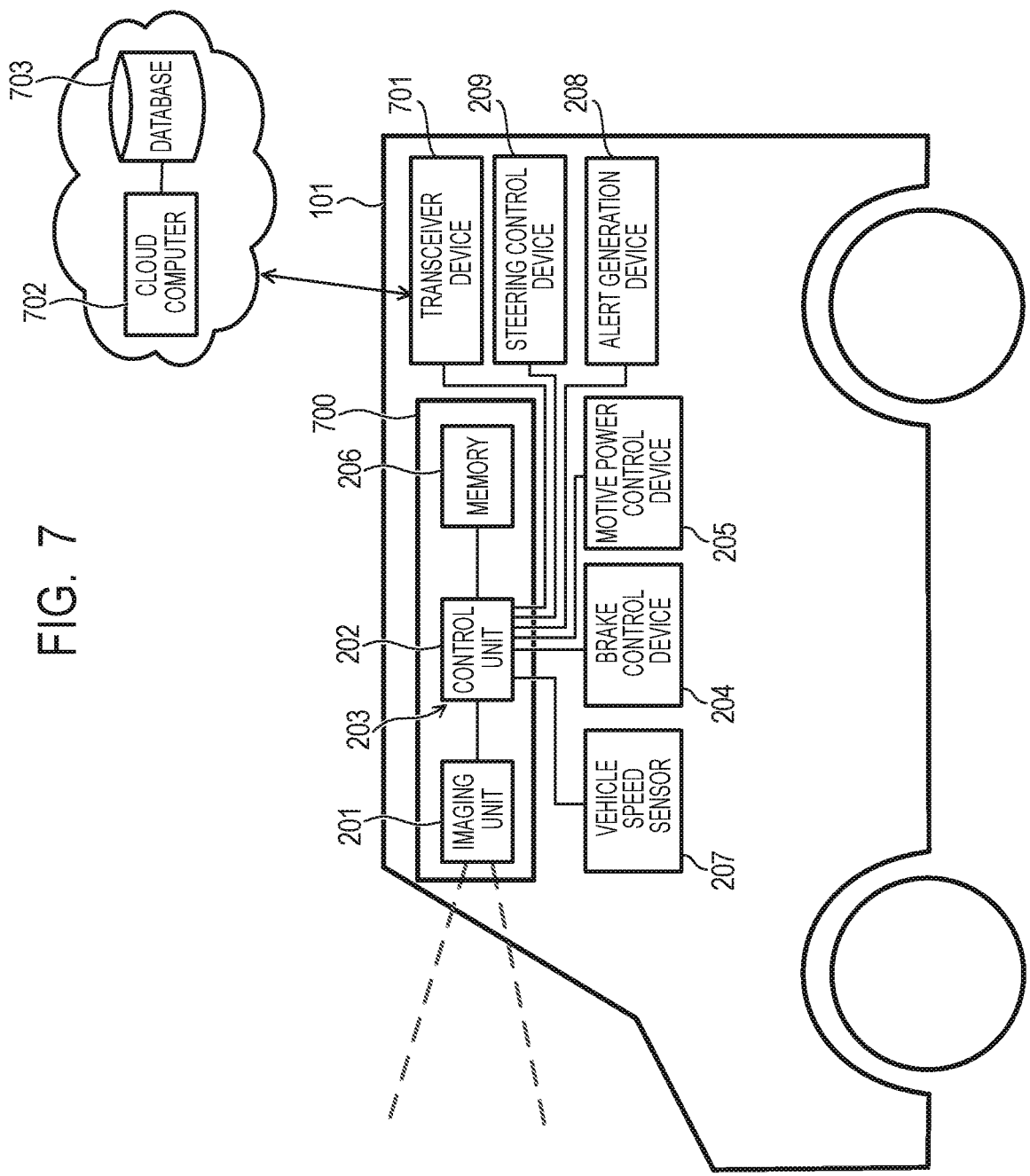
FIG. 7 is a diagram illustrating a control device according to a third embodiment.

A control device and a control method according to a third embodiment will be described by using the drawings. FIG. 7 is a schematic diagram illustrating the vehicle 101 equipped with the control device 700 that is one example of the control device according to the present embodiment. The same components as those in the control device and the control method according to the first or second embodiments illustrated in FIG. 1 to FIG. 6 are labeled with the same references, and the description thereof will be omitted or simplified. The present embodiment is also applicable to any of the vehicles 101 illustrated in FIG. 2 and FIG. 5. That is, the control unit 202 performs the process performed by a cloud computer 702, the memory 206 stores information stored by a database 703, and thereby each operation described in the present embodiment is achieved.

Recently, various safety equipment is provided in a vehicle. Safety equipment refers to equipment used for reducing danger of the vehicle causing an accident and for increasing safety. Safety equipment may be, for example, a device for preventing locking of a brake, a device for preventing a slide slip, or the like. On a slippery road such as a snow road or an icy road, whether or not such safety equipment is provided significantly affects the safety of the vehicle. Further, safety equipment may be a camera, a radar, or the like that monitors the condition around a vehicle. Further, safety equipment may be, for example, an automatic brake that works in response to detection of an obstacle or a nearby vehicle, a function of automatically following a preceding vehicle in various vehicle speed ranges while monitoring the following distance to the preceding vehicle, or the like. Further, safety equipment may be a device that detects the presence or absence of an oncoming car and automatically switches a low beam and a high beam of a headlight, an infrared camera that may find a pedestrian or another vehicle even on a dark road in nighttime, or the like. It is considered that another vehicle 102 without safety equipment is more likely to cause an accident, that is, the danger thereof is higher than another vehicle 102 with safety equipment. Further, it is considered that the degree of danger, that is, the danger degree of another vehicle 102 is different also in accordance with the type of safety equipment.

Further, recently, a vehicle with an automatic driving function has been proposed. It is considered that another vehicle 102 without an automatic driving function is more likely to cause an accident, that is, the danger thereof is higher than another vehicle with an automatic driving function. Further, it is expected that the degree of danger in another vehicle 102, that is, the danger degree may be different in accordance with the level of the automatic driving function. Note that the automatic driving level 1 to the automatic driving level 4 are defined as levels of the automatic driving function ("Cross-ministerial Strategic Innovation Promotion Program (SIP), Automatic Driving System Research and Development Plan", Cabinet Office). The automatic driving level 1 corresponds to a state where a system performs any one of acceleration, steering, and braking. The automatic driving level 2 corresponds to a state where a system performs a plurality of operations out of acceleration, steering, and braking. The automatic driving level 3 corresponds to a state where a system performs all of acceleration, steering, and braking and, when requested by the system, a driver addresses the request. The automatic driving level 4 corresponds to a state where a unit other than a driver performs all of acceleration, steering, and braking and the driver is not at all involved.

Accordingly, in the present embodiment, in addition to the evaluation of danger in the vehicle of the first or second embodiment, a vehicle type (a vehicle model) of another vehicle is detected, and the danger (danger degree) of another vehicle 102 is determined in accordance with the vehicle type. For example, safety equipment or an automatic driving function provided in each vehicle from a vehicle model is identified, and the danger in another vehicle 102 is determined based on such information. The vehicle 101 is then controlled to ensure a sufficient following distance 105 with respect to another vehicle 102 of high danger (danger degree). The safety equipment provided in another vehicle 102 or the automatic driving level of the another vehicle 102 can be determined based on a vehicle model, a grade, a model year, or the like of the another vehicle 102, for example. While the specific flow for more accurately determining the danger in another vehicle 102 will be described in detail with FIG. 9, the simplest procedure is that information on a vehicle type regarded as a dangerous vehicle is stored in the database 703 in advance and the control unit 202 or the cloud computer 702 evenly determines whether the danger in the another vehicle is high or low based on the information on the vehicle type detected from an image acquired by the imaging unit 201. The next-effective procedure is that evaluation of danger associated with a vehicle type is provided in a stepwise manner and control of the vehicle 101 is changed adaptively in accordance with the vehicle type of another vehicle. For example, for higher determined danger in another vehicle, the control unit 202 uses each unit to control the vehicle 101 to increase the following distance between the vehicle 101 and another vehicle 102, travel at a lower speed, or be steered to a more distant position.

The vehicle 101 illustrated in FIG. 7 will be described. The control device 700 has the imaging unit 201, the control unit 202, and the memory 206. The control device 700 may access the cloud computer 702 via a transceiver device 701 provided in the vehicle 101.

The imaging unit 201 captures another vehicle 102 and transmits the image obtained by the capturing to the control unit 202. In the present embodiment, since the distance from the vehicle 101 to another vehicle 102 may be calculated based on the size of another vehicle 102 included in the image as described later, the imaging unit 201 is not required to acquire a parallax image, and the ranging unit 501 (see FIG. 4) is not provided. It is preferable that the imaging unit 201 be able to acquire an image of a sufficient resolution so as to be able to reliably read and determine characters or the like indicated on the vehicle model plate 111, a grade name plate 804, or the like.

The control unit 202 stores images acquired by the imaging unit 201 in the memory 206. The control unit 202 may transmit the image acquired by the imaging unit 201 to the cloud computer 702 via the transceiver device 701 provided in the vehicle 101. The control unit 202 may also perform a compression process on the image acquired by the imaging unit 201 and transmit the compressed image to the cloud computer 702 via the transceiver device 701. Further, the control unit 202 may also extract an image of another vehicle 102 from the image acquired by the imaging unit 201 and transmit only the extracted image to the cloud computer 702 via the transceiver device 701. The control unit 202 detects the speed of the vehicle 101 based on vehicle speed information on the vehicle 101 output from the vehicle speed sensor 207. The control unit 202 stores information on a number plate 803 (see FIG. 8A) of another vehicle 102 of interest in the memory 206. Note that, based on the image of another vehicle 102 acquired by the imaging unit 201, the information on the number plate 803 of another vehicle 102 may be detected by the control unit 202 or may be detected by the cloud computer 702. The control unit 202 stores information regarding the danger in the another vehicle 102 determined as described later by the cloud computer 702 in the memory 206 in association with information on the number plate 803 of the another vehicle 102. When no information on a number plate is detected, it is preferable to associate information on a position at which the another vehicle 102 is detected in the image with information on danger, for example.

In the database 703 of the cloud computer 702, model names (vehicle models) of respective vehicles sold in the past and various vehicle information associated with the vehicle models are stored. Various vehicle information may be, for example, a vehicle size, image or character information on a vehicle model plate (a vehicle model emblem) or a grade name plate, information regarding the position of a vehicle model plate or a grade name plate, or the like. Further, various vehicle information may be an image of an emblem (not illustrated), information regarding whether or not some safety equipment is equipped, information regarding an automatic driving level, a model year of a vehicle, an image of a vehicle of each model year, or the like. The cloud computer 702 stores a set of the above information in the database 703. Further, for example, a particular vehicle may be stored in the database 703 as a vehicle of high danger in a set with the vehicle number as vehicle information, and a dangerous vehicle may be detected by comparing the above information with information on the detected another vehicle 102. For example, such a particular vehicle may be a vehicle stored based on a public database or the like in which information on past accident histories, stolen vehicles, or the like is stored to the degree that personal information is not identified, or may be a vehicle whose determination result obtained when the danger in the vehicle was determined in the past by the vehicle 101 is stored.

The cloud computer 702 has an image recognition function that is necessary for recognition of the vehicle model or the like of another vehicle 102. The cloud computer 702 determines the vehicle model or the like of another vehicle 102 included in an image based on the image received from the control device 700 via the transceiver device 701 and determines the danger in the another vehicle 102 based on the vehicle model or the like of the another vehicle 102. The cloud computer 702 includes a large scale computer and thus has a faster processing speed than the control unit 202 and is preferable for processing using a heavy image.

Figure 8A:
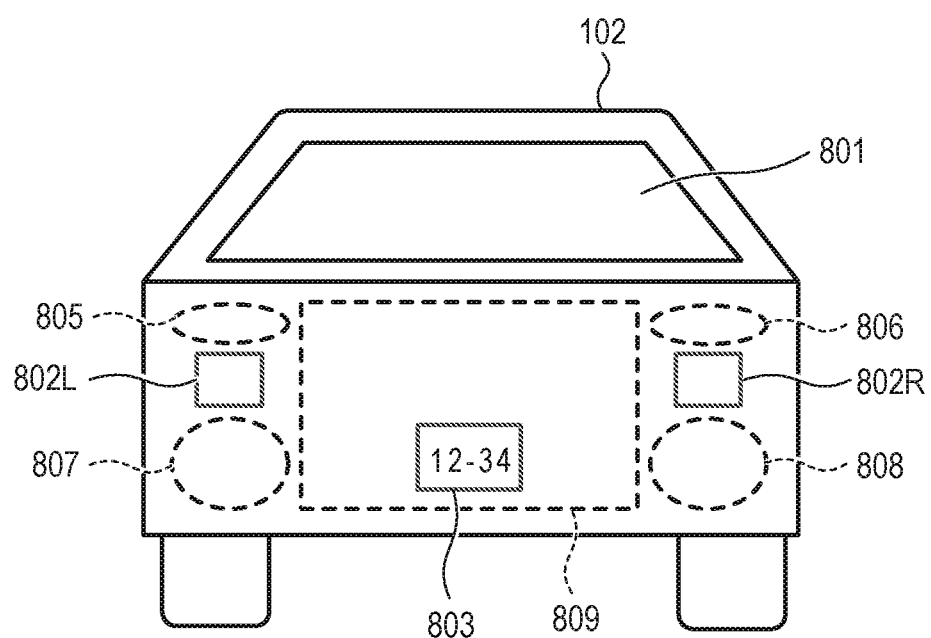
FIG. 8A is a diagram illustrating an example of another vehicle.
Figure 8B:
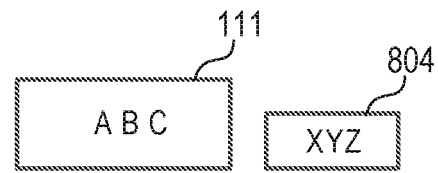
FIG. 8B is a diagram illustrating an example of a vehicle model plate and a grade name plate of another vehicle.

A method in which the cloud computer 702 detects vehicle information on another vehicle 102 from the image received from the control device 700 will be described below. FIG. 8A is a diagram illustrating an example of a state of another vehicle 102 when viewed from the rear side. As illustrated in FIG. 8A, a rear window 801, taillights 802L and 802R, the number plate 803, and the like are provided on the rear part of another vehicle 102. FIG. 8B is a diagram illustrating an example of a vehicle model plate and a grade name plate. The cloud computer 702 searches an image of another vehicle 102 for the vehicle model plate 111. The vehicle model plate 111 may often be located on the upper side of the taillights 802L and 802R. Therefore, the cloud computer 702 first performs a search for the vehicle model plate 111 on regions 805 and 806 on the upper side of the left and right taillights 802L and 802R. When the vehicle model plate 111 is not found in the regions 805 and 806 on the upper side of the left and right taillights 802L and 802R, the cloud computer 702 performs a search for the vehicle model plate 111 on regions 807 and 808 on the lower side of the left and right taillights 802L and 802R. This is because, next to the regions 805 and 806 on the upper side of the taillights 802L and 802R, the vehicle model plate 111 is the most likely to be arranged in the regions 807 and 808 on the lower side of the taillights 802L and 802R. When the vehicle model plate is not found in the region on the lower side of the left and right taillights 802L and 802R, the cloud computer 702 performs a search for the vehicle model plate 111 on a region 809 between the left taillight 802L and the right taillight 802R. This is because, next to the regions 807 and 808 on the lower side of the taillights 802L and 802R, the vehicle model plate 111 is likely to be arranged in the region 809 between the left taillight 802L and the right taillight 802R. In such a way, in the present embodiment, since the search for the vehicle model plate 111 is performed from a region in which the vehicle model plate 111 is more likely to be arranged, the vehicle model plate 111 can be detected quickly and efficiently. The cloud computer 702 reads and determines the indication, that is, characters or the like in the vehicle model plate 111 and determines the vehicle model of another vehicle 102 of interest.

The cloud computer 702 performs a search for the grade name plate 804 in the same manner as the search for the vehicle model plate 111. The cloud computer 702 reads and determines the indication, that is, characters or the like in the grade name plate 804 and determines the grade of another vehicle 102 of interest.

Note that, while the case where a vehicle model is indicated by the vehicle model plate 111 is described here as an example, the vehicle model is not always indicated by the vehicle model plate 111. Further, while the case where a grade name is indicated by the grade name plate 804 is described here as an example, the grade name is not always indicated by the grade name plate 804. For example, a vehicle model or a grade name may be engraved in a vehicle body, or a vehicle model or a grade name may be written by paint on a vehicle body. The cloud computer 702 may detect the vehicle model or the grade name of another vehicle 102 of interest even when the vehicle model or the grade name is indicated by a member other than the vehicle model plate 111 or the grade name plate 804. Further, since a vehicle model or a grade name is highly likely to be expressed by characters including an alphabet, a number, or the like, the cloud computer 702 may perform a search for a vehicle model or a grade name only on the limited image including characters or the like.

The cloud computer 702 determines a model year of another vehicle 102 based on an image of the another vehicle 102. In the database 703 of the cloud computer 702, a vehicle model, a model year, and an image of the vehicle of the model year are associated with each other and stored as described above. Therefore, the cloud computer 702 can determine the model year of another vehicle 102 by comparing an image of a vehicle of the vehicle model of each model year with an image of another vehicle 102. Furthermore, information on an accident history or a recall history or the like in the past may be stored in association with the vehicle model or the model year. A flag may be attached or the like so that a vehicle with an accident history or a recall history in the past is detected to be of higher danger than a vehicle without an accident history or a recall history in the past.

The cloud computer 702 detects the presence or absence of safety equipment provided in another vehicle 102 or the automatic driving level of another vehicle 102 based on information on the vehicle model, the model year, and the grade. When the grade name plate 804 is not found, the cloud computer 702 may determine the safety equipment provided to another vehicle 102 or the automatic driving level of another vehicle 102 based on the vehicle model and the model year.

The cloud computer 702 calculates the distance 105 from the vehicle 101 to another vehicle 102 based on the size of the another vehicle 102 included in an image received from the control device 700 via the transceiver device 701. In the cloud computer 702, data of the vehicle size of the another vehicle 102 is stored as described above. It is therefore possible to calculate the distance 105 from the vehicle 101 to another vehicle 102 based on data of the vehicle size (the width, the height, or the like) stored in the cloud computer 702 and the size (the width, the height, or the like) of the another vehicle 102 included in the image. Note that the distance from the vehicle 101 to another vehicle 102 may be calculated by the method described in the first embodiment in conjunction with the vehicle configuration as illustrated in FIG. 2 and FIG. 5.

The cloud computer 702 transmits information described above used for indicating the danger in another vehicle 102 of interest and information indicating the distance from the vehicle 101 to the another vehicle 102 to the control unit 202 provided to the control device 700 via the transceiver device 701.

The control unit 202 generates a signal used for controlling the vehicle 101 based on the above information obtained by the cloud computer 702 and the traveling speed of the vehicle 101 detected by the vehicle speed sensor 207. For example, when the danger in the preceding vehicle 102*a* is high, the following distance 105*a* between the vehicle 101 and the preceding vehicle 102*a* may be twice a stopping distance estimated from the traveling speed of the vehicle 101, for example. On the other hand, when the danger in the preceding vehicle 102*a* is low, the following distance 105*a* between the vehicle 101 and the preceding vehicle 102*a* may be the same as the stopping distance estimated from the traveling speed of the vehicle 101. When the danger in another vehicle 102 is high or the possibility of the vehicle 101 colliding with another vehicle 102 is high, the control unit 202 may issue an alert by using the alert generation device 208 provided in the vehicle 101.

FIG. 9 is a flowchart illustrating an example of the operation of the control device according to the present embodiment. While an example in which a part of the operation performed in each step is performed by the cloud computer 702 will be illustrated below, a part or all of such control may be performed in the control unit 202 inside the vehicle 101. This operation starts in response to the start of traveling of the vehicle 101 (for example, vehicle speed information or information regarding a brake) as a trigger. The start timing of the operation is not limited to the above, the operation may be started at any timing in accordance with a setting by a user operation to the operating unit 210 (including a setting of a trigger itself such as the vehicle speed or detection of another vehicle 102), for example.

In step S301, images are acquired by the imaging unit 201. The imaging unit 201 transmits the acquired images to the control unit 202. In the present embodiment, the control unit 202 transmits images to the cloud computer 702 via the transceiver device 701 sequentially at a suitable timing.

In step S302, the cloud computer 702 detects another vehicle 102 based on the images acquired by the imaging unit 201 and calculates the distance 105 from the vehicle 101 to another vehicle 102 by the scheme described above, for example.

In step S901, the cloud computer 702 detects zigzag driving and lane deviation of another vehicle 102 in the same manner as step S303 of the first embodiment based on the images received from the control device 700. The detection result is stored in the memory 206 or the database 703 in association with information on the corresponding another vehicle 102.

In step S902, the cloud computer 702 evaluates the driver of another vehicle 102 in the same manner as step S601 of the second embodiment based on the image received from the control device 700. An evaluation result (information on whether or not the driver is of high danger, or information on the level of danger in the driver) is stored in the memory 206 or the database 703 in association with information on corresponding another vehicle 102.

In step S903, the cloud computer 702 detects vehicle information regarding a vehicle body of another vehicle 102 such as the vehicle model, the model year, the grade, the past accident history, or the like as described above in the present embodiment based on the image received from the control device 700 via the transceiver device 701. A detection result of vehicle information is stored in the memory 206 or the database 703 in association with information on corresponding another vehicle 102.

In step S904, the cloud computer 702 determines the danger in another vehicle 102 based on the detection result and the evaluation result of steps S901 to S903.

In step S905, the control unit 202 generates a signal used for controlling the vehicle 101 based on the distance from the vehicle 101 to another vehicle 102, the danger in the another vehicle 102, and the traveling speed of the vehicle 101.

In step S905, information regarding zigzag driving and lane deviation of another vehicle 102, evaluation information on the driver (information regarding the danger), and vehicle information such as the vehicle model, the model year, the grade, the accident history, or the like of the vehicle have been acquired as described above as information for determining the danger in another vehicle. These pieces of information have different priorities in accordance with the type of information or a detection result. For example, even when a vehicle is determined from vehicle information as a vehicle that has sufficient safety equipment, a high automatic driving level, and less accident history, it may be necessary to increase the level of danger with respect to a vehicle for which raging zigzag driving is detected and apply control of the vehicle 101 against such a vehicle with the highest prioritized consideration. Therefore, in the present embodiment, the driving information on another vehicle such as information on zigzag driving or lane deviation is of the highest priority, and the evaluation information on the driver is of the next priority, and the vehicle information is of the lower priority. Specifically, a weighing to evaluation is changed in this order, it is determined which another vehicle 102 of the plurality of other vehicles 102 has to be addressed with the highest priority. Further, when the distance to the subject vehicle 101 is shorter than the stopping distance determined from the current vehicle speed of the subject vehicle 101, it is preferable to apply control of the vehicle 101 to address the vehicle of interest with the highest priority.

After step S905, the operations on and after step S301 are repeated.

Note that, while the case where the control unit 202 generates a signal in step S905 for both the cases of a high degree of danger and a low degree of danger in another vehicle 102 has been described above as an example, the embodiment is not limited thereto. For example, the control unit 202 may generate a signal in step S905 only when the degree of danger in another vehicle 102 is high. In such a case, if it is determined that the degree of danger in another vehicle 102 is low in step S904, the process returns to step S301 without performing step S905. Further, a series of operations above of the control device 700 illustrated in FIG. 9 ends in response to the speed of the vehicle 101 decreasing below a predetermined speed, stop of the engine, or the like.

As described above, also in the present embodiment, the danger in another vehicle 102 is determined based on the image acquired by the imaging unit 201. Specifically, the danger in another vehicle 102 is determine based further on vehicle information that can determine safety equipment or a safety driving function of another vehicle 102 in addition to the information in the first and second embodiments. A signal used for controlling the vehicle 101 is then generated based on the danger in another vehicle 102. Thus, also in the present embodiment, safety of the vehicle 101 can be improved.

Fourth Embodiment

A control device and a control method according to the present embodiment will be described by using the drawings. The same components as those in the control device and the control method according to the first to third embodiment illustrated in FIG. 1 to FIG. 9 are labeled with the same references, and the description thereof will be omitted or simplified.

The driver of the preceding vehicle 102a may be so-called tailgating the pre-preceding vehicle 102b traveling in front of the preceding vehicle 102a. Tailgating is driving such that a preceding vehicle travels at a very close position to the pre-preceding vehicle. In tailgating, danger of collision of the preceding vehicle 102a with the pre-preceding vehicle 102b is high. Further, as a result of the driver of the pre-preceding vehicle 102b having a feeling of pressure from the preceding vehicle 102a traveling behind the pre-preceding vehicle 102b, the pre-preceding vehicle 102b may be forced to increase the traveling speed or may be forced to change the lane. As a result, this may increase a possibility of the pre-preceding vehicle 102b causing an accident. Further, the preceding vehicle 102a may perform forcible passing, and thus the preceding vehicle 102a is likely to cause an accident. When the pre-preceding vehicle 102b causes an accident, the preceding vehicle 102a traveling immediately behind the pre-preceding vehicle 102b is likely to be involved in the accident. When the pre-preceding vehicle 102b suddenly stops while the preceding vehicle 102a is tailgating, the preceding vehicle 102a is likely to fail to avoid collision with the pre-preceding vehicle 102b. Accordingly, in the present embodiment, danger in another vehicle 102 is determined by focusing on whether or not another vehicle 102 is tailgating, and a sufficient following distance 105 is ensured with respect to another vehicle 102 of high danger.

While the configuration of the control device according to the present embodiment is also applicable to the configuration example of the vehicle 101 of all of FIG. 2. FIG. 5, and FIG. 7, the description will now be provided with FIG. 5. The control device 500 has the imaging unit 201, the control unit 202, the memory 206, and the ranging unit 501. For example, the imaging unit 201 is formed of seven imaging devices used for capturing a forward direction, a diagonal left forward direction, a diagonal right forward direction, a left side direction, a right side direction, a diagonal left backward direction, and a diagonal right backward direction of the vehicle 101, respectively. As the imaging unit 201, for example, an imaging unit that can acquire parallax images is used as with the imaging unit 201 described above in the first embodiment. As the ranging unit 501, as described in the second embodiment, a millimeter-wave radar is used, for example. In the present embodiment, the ranging unit 501 formed of a millimeter-wave radar or the like is used because of the reason below. That is, when another vehicle 102 is located in the distance, measurement of a distance using a millimeter-wave radar or the like is less likely to be affected by fog, exhausted gas, or the like and thus is less likely to be subjected to a reduction in distance measurement accuracy than measurement of a distance based on parallax images. The ranging unit 501 can measure the distance to the pre-preceding vehicle 102b located in front of the preceding vehicle 102a.

The control unit 202 acquires information on the following distance 105a between the vehicle 101 and the preceding vehicle 102a based on parallax images acquired by the imaging unit 201, for example. Further, the control unit 202 acquires information on the distance from the vehicle 101 to the pre-preceding vehicle 102b by using the ranging unit 501. The control unit 202 then calculates the following distance 105b between the preceding vehicle 102a and the pre-preceding vehicle 102b based on the above information. Note that, while the case where the following distance 105a between the vehicle 101 and the preceding vehicle 102a is calculated based on parallax images acquired by the imaging unit 201 is described here as an example, the embodiment is not limited thereto. For example, information on the following distance 105a between the vehicle 101 and the preceding vehicle 102a may be acquired by using the ranging unit 501. Further, information on the distance from the vehicle 101 to the pre-preceding vehicle 102b may be calculated based on parallax images acquired by the imaging unit 201, for example. The control unit 202 determines whether or not the preceding vehicle 102a is tailgating based on the following distance 105b between the preceding vehicle 102a and the pre-preceding vehicle 102b. For example, when the following distance 105b between the preceding vehicle 102a and the pre-preceding vehicle 102b is less than or equal to a predetermined distance even though the preceding vehicle 102a and the pre-preceding vehicle 102b are traveling, it is determined that the preceding vehicle 102a is tailgating. For example, such a predetermined distance may be a length of a vehicle, specifically, around 5 m, for example, but is not limited thereto.

If the control unit 202 determines that the preceding vehicle 102a is tailgating, the control unit 202 determines that the danger in the preceding vehicle 102a is high. That is, the control unit 202 determines the danger in the preceding vehicle 102a based on the following distance 105b between the preceding vehicle 102a and the pre-preceding vehicle 102b. The control unit 202 then generates a signal used for controlling the vehicle 101 based on the distance 105 from the vehicle 101 to another vehicle 102, the danger in the another vehicle 102, and the stopping distance estimated from the traveling speed of the vehicle 101. For example, when the following distance 105a between the vehicle 101 and the preceding vehicle 102a is not necessarily sufficiently ensured even though the preceding vehicle 102a is tailgating, the control unit 202 may generate a signal as described below. That is, in such a case, the control unit 202 generates a signal that causes the brake control device 204 to actuate a brake and transmits the generated signal to the brake control device 204. Further, in such a case, the control unit 202 generates a signal that causes the motive power control device 205 to suppress the drive power of the motive power source and transmits the generated signal to the motive power control device 205. Thereby, the traveling speed of the vehicle 101 decreases, and the following distance 105a between the preceding vehicle 102a of high danger and the vehicle 101 is sufficiently ensured. Further, if the control unit 202 determines that the danger of the preceding vehicle 102a colliding with another vehicle 102 is high, the control unit 202 may alert the driver of the vehicle 101 by using the alert generation device 208, for example.

Further, the control unit 202 may change the lane based on the danger in another vehicle 102. Specifically, the control unit 202 may generate a signal for controlling the vehicle 101 to travel on a different traveling lane from the preceding vehicle 102a based on the danger in the preceding vehicle 102a. When a lane change is to be performed, it is preferable that the control unit 202 issue an alert that prompts the driver to change a lane by using the alert generation device 208 or the like before entering the operation of the lane change. For example, when the driver does not start changing a lane even after an alert that prompts the driver to change a lane is issued, the control unit 202 may notify the driver that a lane change is automatically performed. Then, a lane change may be performed when the driver indicates an intention of allowing the lane change. The indication of an intention of a lane change may be performed by pressing of an enabling button (not illustrated) or the like, for example. In a lane change, it is important to recognize whether or not another vehicle 102d traveling on a changed traveling lane (see FIG. 1) is located near the vehicle 101. Further, it is important to recognize the danger in another vehicle 102d traveling on the changed traveling lane in a similar manner to the preceding vehicle 102a. Further, it is important to control the traveling speed of the vehicle 101 and perform the operation of a lane change at a suitable timing so that the following distance between the another vehicle 102d and the vehicle 101 is sufficiently ensured. When a lane change is automatically performed, the control unit 202 transmits a control signal to the steering control device 209 provided in the vehicle 101.

Figure 10:
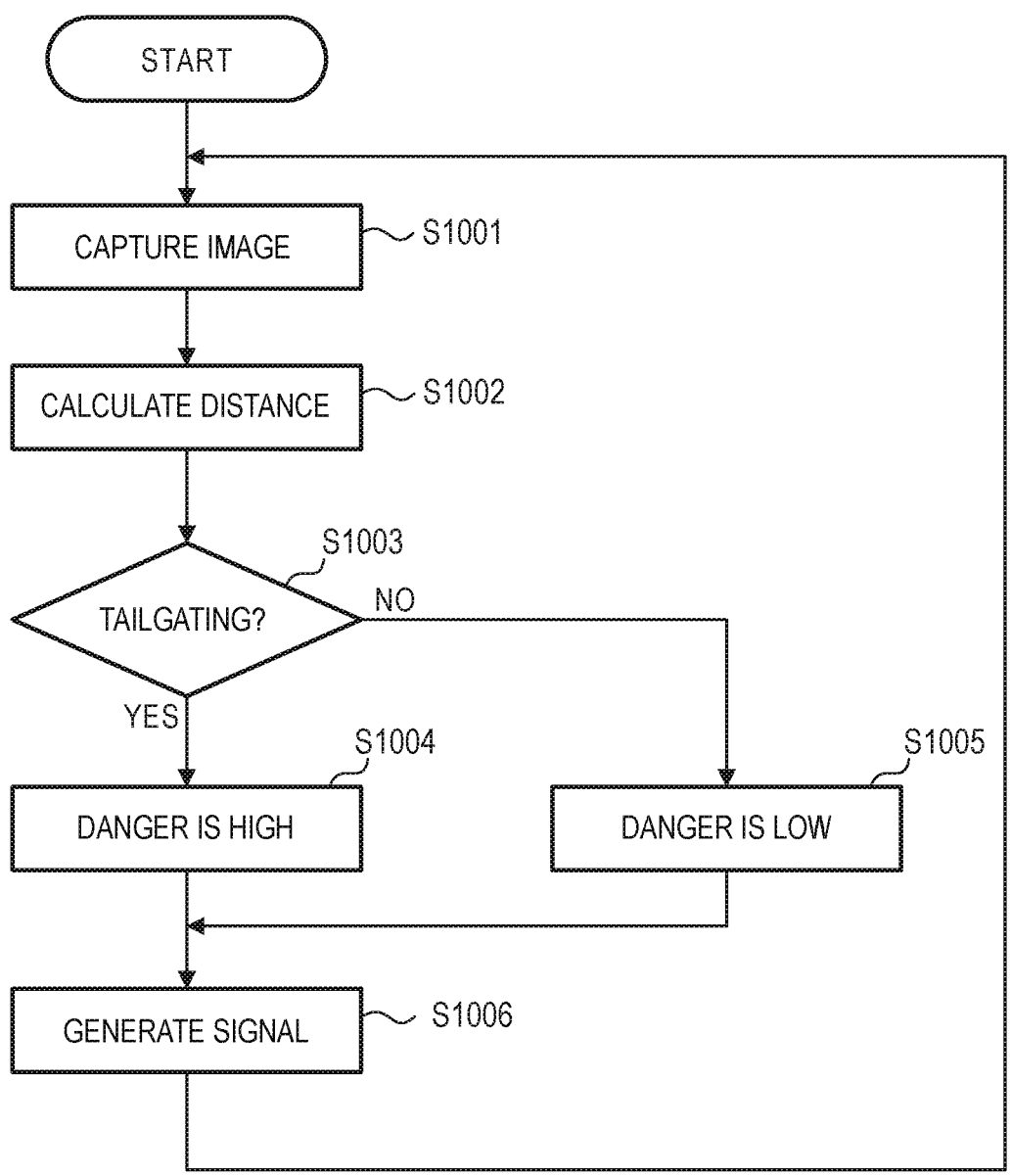
FIG. 10 is a flowchart illustrating an operation of the control device according to a fourth embodiment.

FIG. 10 is a flowchart illustrating the operation of the control device according to the present embodiment. This operation starts in response to the start of traveling of the vehicle 101 (for example, vehicle speed information or information regarding a brake) as a trigger. The start timing of the operation is not limited to the above, the operation may be started at any timing in accordance with a setting by a user operation to the operating unit 210 (including a setting of a trigger itself such as the vehicle speed or detection of another vehicle 102), for example.

In step S1001, capturing is performed by the imaging unit 201. Images acquired by the imaging unit 201 are input to the control unit 202.

In step S1002, the control unit 202 performs a distance calculation process. Specifically, the control unit 202 acquires information on the following distance 105a between the vehicle 101 and the preceding vehicle 102a based on parallax images acquired by the imaging unit 201, for example. Further, the control unit 202 acquires information on the distance from the vehicle 101 to the pre-preceding vehicle 102b by using the ranging unit 501, for example. The control unit 202 then calculates the following distance 105b between the preceding vehicle 102a and the pre-preceding vehicle 102b based on the above information.

In step S1003, based on the distance between the preceding vehicle 102a and the pre-preceding vehicle 102b, for example, the control unit 202 determines whether or not the preceding vehicle 102a is tailgating. If the preceding vehicle 102a is tailgating (step S1003, YES), the process proceeds to step S1004. On the other hand, if the preceding vehicle 102a is not tailgating (step S1003, NO), the process proceeds to step S1005.

In step S1004, the control unit 202 determines that the danger in the preceding vehicle 102a is high. The process then proceeds to step S1006.

In step S1005, the control unit 202 determines that the danger in the preceding vehicle 102a is low. The process then proceeds to step S1006.

In step S1006, the control unit 202 generates a signal used for controlling the vehicle 101 based on the distance 105 from the vehicle 101 to the preceding vehicle 102a, the danger in the preceding vehicle 102a, and the traveling speed of the vehicle 101. For example, when the following distance 105a between the vehicle 101 and the preceding vehicle 102a is not sufficiently ensured even when the preceding vehicle 102a is a vehicle of high danger, the control unit 202 may generate a signal as described below.

For example, a signal for controlling the vehicle 101 so that the following distance 105 between the vehicle 101 and another vehicle 102 is longer than or equal to a first distance, for example, is generated. The first distance is around twice the stopping distance estimated from the traveling speed of the vehicle 101, for example. Specifically, the control unit 202 generates a signal that causes the brake control device 204 to perform a brake operation and transmits the generated signal to the brake control device 204. Further, the control unit 202 generates a signal that causes the motive power control device 205 to suppress the drive power of the motive power source and transmits the generated signal to the motive power control device 205. Thereby, the traveling speed of the vehicle 101 decreases, and the following distance 105a between the vehicle 101 and preceding vehicle 102a is ensured to be the first distance or longer, for example. Then, operations of step S1001 and subsequent steps are repeated.

Note that, while the case where the control unit 202 generates a signal in step S1006 for both the cases of a high degree of danger and a low degree of danger in another vehicle 102 has been described above as an example, the embodiment is not limited thereto. For example, the control unit 202 may generate a signal in step S1006 only when the degree of danger in another vehicle 102 is high. In such a case, after the completion of step S1005, the process returns to step S1001 without performing step S1006. Further, a series of operations above of the control device 500 illustrated in FIG. 10 ends in response to the speed of the vehicle 101 decreasing below a predetermined speed, stop of the engine, or the like.

As described above, also in the present embodiment, the danger in another vehicle 102 is determined based on the images acquired by the imaging unit 201. Specifically, the danger in the preceding vehicle 102a is determine based on whether or not the preceding vehicle 102a is tailgating. A signal used for controlling the vehicle 101 is then generated based on the danger in the preceding vehicle 102a. Thus, also in the present embodiment, safety of the vehicle 101 can be improved.

Modified Embodiments

While the present invention has been described above in detail based on the preferred embodiments, the present invention is not limited to these particular embodiments, and various forms within the scope not departing from the spirit of the invention are included in the present invention. For example, the embodiments described above may be appropriately combined.

Further, while the case where the imaging unit 201 that can acquire a parallax image from a single imaging element is used has been described as an example in the first embodiment, the invention is not limited thereto. For example, the imaging unit that acquires a parallax image by using a plurality of imaging elements arranged at different positions from each other, that is, a stereo camera (multi-ee camera) may be used. However, the imaging unit 201 that can acquire a parallax image by using a single imaging element is less likely to cause misalignment of the optical system and is preferable in terms of reduction in size compared to a case of acquiring a parallax image by using a plurality of imaging elements.

Further, while the case where the distance from the vehicle 101 to another vehicle 102 is measured by using the ranging unit 501 has been described as an example in the second embodiment, the invention is not limited thereto. For example, the distance from the vehicle 101 to another vehicle 102 may be measured based on a parallax image acquired by the imaging unit 201 that can acquire a parallax image. In such a case, the ranging unit 501 is not required to be provided.

Further, while the case where there is no difference between control performed when the driver of another vehicle 102 is a beginner and control performed when the driver of another vehicle 102 is an elderly person has been described as an example in the second embodiment, the invention is not limited thereto. For example, there may be a difference between control performed when the driver of another vehicle 102 is a beginner and control performed when the driver of another vehicle 102 is an elderly person.

Further, while the case where a millimeter-wave radar is used for the ranging unit 501 has been described as an example in the first and second embodiments, the invention is not limited thereto. For example, a ranging sensor that measures a distance to an object by a Time Of Flight (TOF) scheme may be used. The TOF scheme is a ranging scheme to detect the distance to the object by emitting a light, from a light source to an object and measuring the time required for the light reflected by the object to return to a photodetector arranged at substantially the same position as the light source. The light emitted from the light source may be a short-pulse light or the like, for example. Further, a light emitted from a light source is not limited to a short-pulse light. A continuous light whose intensity is modulated with a square wave, a sine wave, or the like, that is, a continuous wave (CW) light may be emitted from a light source. In such a case, the distance to an object can be calculated based on a phase delay of a light detected by a photodetector. Further, while the photodetector provided in a ranging sensor can be formed of a single photodiode, for example, the invention is not limited thereto. For example, the photodetector may be formed of a line sensor in which photodiodes are aligned in a line. Further, the photodetector may be formed of an imager (an image sensory in which photodiodes are arranged on a plane, that is, two-dimensionally. When the photodetector is formed using an imager, it is possible to acquire a distance image configured from distance information for a plurality of points. Further, the angle range from which the distance information is obtained depends on an irradiation range of a light from a light source. When wide range distance information is intended to be obtained, alight may be emitted to a wide range by scattering the light, for example. Further, for example, when a light of a small beam diameter, such as a laser light, is emitted, the light may be emitted to a wide range by using a scan optical system such as a Galvano mirror, a polygon mirror, or the like. When a laser light source, a scan optical system, and a photodetector formed of a single photodiode are combined for use, it is possible to sequentially acquire distance information for respective points and generate a distance image by using the acquired distance information for respective points. When a light source that emits light to a wide range and a photodetector formed of an imager are combined for use, it is also possible to globally acquire distance information for respective points as a distance image. It is preferable to use, as a light source, a laser light or the like that may propagate to a long distance without scattering when a distance to a distant object is measured. On the other hand, a light source for wide range emission is suitable when a distance to an object located in a short range is measured.

Further, while the case where a millimeter-wave radar is used for the ranging unit 501 has been described as an example in the first and second embodiments, an ultrasonic-wave sensor or the like may be used, for example, without being limited to the millimeter-wave radar.

Further, while the case where a vehicle model is determined based on the vehicle model plate 111 has been described as an example in the third embodiment, the invention is not limited thereto. For example, the vehicle model of another vehicle 102 may be determined based on the entire image of another vehicle 102. For example, images of respective vehicles sold in the past are stored in the database 703 of the cloud computer 702 in advance. Then, the vehicle model of another vehicle 102 may be determined by performing matching of the image of each vehicle sold in the past with the image of another vehicle 102. The matching scheme may be a scheme to perform matching by extracting feature points of the image and comparing the feature points, for example. Further, matching is performed by using correlation between one image and the other image. Further, a known scheme of image similarity determination may be appropriately used. When the vehicle model of another vehicle 102 based on the image of another vehicle 102 is determined, the image of another vehicle 102 is not limited to the image obtained when another vehicle 102 is viewed from the rear side. For example, it is also possible to determine a vehicle model or the like based on an image of the side or the like of another vehicle 102. Further, in a case of another vehicle 102 traveling on the opposite lane, it is also possible to determine a vehicle model or the like based on an image of the front part of the another vehicle 102.

Further, while the case where the vehicle model plate 111 or the like is attached to the rear part of another vehicle 102 has been described as an example in the third embodiment, the invention is not limited thereto. For example, when the vehicle model plate 111 or the grade name plate 804 is attached to the side of another vehicle 102, it is possible to determine the vehicle model, the grade name, or the like based on the vehicle model plate 111, the grade name plate 804, or the like attached to the side of another vehicle 102. Further, for example, when an emblem, a mark, or the like unique to the vehicle type of another vehicle 102 is attached to the front part of the another vehicle 102, it is possible to determine the vehicle model or the like of the another vehicle 102 based on the emblem, the mark, or the like attached to the front part of another vehicle 102.

Further, while the case where the vehicle model is determined based on the vehicle model plate 111 has been described as an example in the third embodiment, the invention is not limited thereto. For example, an emblem unique to the vehicle type of interest may be attached to another vehicle 102. It is also possible to determine a vehicle model based on such an emblem unique to a model type. For example, images of emblems unique to the vehicle types are stored in the database 703 of the cloud computer 702 in advance. Then, the vehicle model of another vehicle 102 of interest may be determined by performing matching of the image of the emblem with the image of the emblem of another vehicle.

Further, while the case where the vehicle model plate 111 and the grade name plate 804 are searched for has been described as an example in the third embodiment, the invention is not limited thereto. For example, when the grade name is used for a single vehicle type, it is possible to determine a vehicle model based on a grade name determined by the grade name plate 804 even before the vehicle model plate 111 is found.

Further, while the case where a grade is determined has been described as an example in the third embodiment, the invention is not limited thereto. For example, in a case of a vehicle type in which there is no difference in safety equipment or an automatic driving level with respect to a grade, since it is not necessary to determine the grade, a search may end when the vehicle model plate 111 is found.

Further, while the case where the distance 105 from the vehicle 101 to another vehicle 102 of interest is calculated based on the size of another vehicle 102 included in an image and information regarding the vehicle size of the another vehicle 102 has been described as an example in the third embodiment, the invention is not limited thereto. The imaging unit 201 may have an imaging optical system that can acquire parallax images as with the first and second embodiments and calculate the distance 105 from the vehicle 101 to another vehicle 102 of interest based on a group of the parallax images. Further, the ranging unit 501 may be provided independently of the imaging unit 201 as with the first and second embodiments, and the distance 105 may be acquired from the vehicle 101 to another vehicle 102 of interest.

Further, in the third embodiment, in step S904, the model year of another vehicle 102 may be determined based on the form of characters in the vehicle model plate detected in the image acquired by the imaging unit 201.

Further, in the third embodiment, in step S904, the model year or the like of another vehicle 102 may be determined based on the position at which a vehicle model plate is attached that is detected in the image acquired by the imaging unit 201. The reference for the position where a vehicle model plate is attached may be the end of the vehicle or may be the upper end of a trunk lid, for example. Further, the model year may be determined based on a grade name unique to a model year, an emblem unique to a model year, or the like.

Further, in the third embodiment, the vehicle model, the grade, the model year, or the like may be determined based on both an image of the vehicle model plate 111 and the entire image of another vehicle 102. For example, images of respective model years of respective vehicles sold in the past are stored in the database 703 of the cloud computer 702 in advance. The cloud computer 702 then determines the vehicle model based on the vehicle model plate 111. In response to determination of the vehicle model, the cloud computer 702 extracts only the image of a vehicle of the vehicle model of interest from the database 703. The cloud computer 702 may then determine the grade, the model year, or the like of another vehicle 102 of interest by comparing the image extracted from the database 703 with the entire image of the another vehicle 102. Since a target to be compared with the image of another vehicle 102 includes only the image extracted from the database 703 based on a vehicle model, it is possible to reduce the time required for determination.

Further, in the third embodiment, danger in another vehicle 102 may be determined based on a vehicle model without determining the model year or the like. For example, in a case of an old type vehicle such as a vehicle that is no longer available in the market, safety equipment or an automatic driving function may not be provided even in a vehicle of the last model year. In such a case, a determination process for a model year or the like will be a useless process. Therefore, in such a case, danger in another vehicle 102 may be determined based on the vehicle model without determining the model year or the like. Thereby, a processing load can be reduced.

Further, while the case where the control unit 202 generates a signal used for controlling the vehicle 101 has been described as an example in the third embodiment, the cloud computer 702 may generate a signal used for controlling the vehicle 101.

Further, while the case where the cloud computer 702 is used in each flow of FIG. 9 and FIG. 10 related to analysis of another vehicle 102 has been described as an example in the third embodiment, the cloud computer 702 may not be necessarily required to be used. For example, each process performed by the cloud computer 702 in the third embodiment may be performed by the control unit 202 provided in the control device 700. Further, some of the processes performed by the cloud computer 702 in the third embodiment may be performed by the control unit 202 provided in the control device 700. For example, a process with a heavy load may be performed by the cloud computer 702, and a process with a light load may be performed by the control unit 202 provided in the control device 700. The process with a heavy load may be a process using a large image data (a large number of pixels, a large number of bits of each pixel), a process using a large number of image data, a search process in a wide range such as the vehicle model plate 111 or the like, or the like.

Further, in the third embodiment, when the vehicle 101 comes close to another vehicle 102 and a certain size of another vehicle 102 is included in an image, determination of the vehicle model of the another vehicle 102 or the like may be performed based on the image. For example, this is because, when the vehicle model plate 111 or the like is included in a significantly small area in an image, it is not always easy to determine the vehicle model based on the vehicle model plate 111 of interest.

Further, in each embodiment, the imaging unit 201 may increase the capturing frequency when the vehicle 101 comes close to another vehicle 102 and decrease the capturing frequency when the distance from the vehicle 101 to another vehicle 102 is long. This is because, when the vehicle 101 comes close to another vehicle 102, a good image of the vehicle model plate 111 or the like so as to facilitate determination of the vehicle model or the like may be acquired.

Further, in the third embodiment, after the completion of determination on the danger in another vehicle 102, information on the danger or the like of another vehicle 102 may be stored in the memory 206, the database 703, or the like in association with the information of the number plate 803 of the another vehicle 102. For example, another vehicle 102d traveling on the passing lane may cut in between the preceding vehicle 102a and the vehicle 101. In such a case, the preceding vehicle 102a will not be seen from the vehicle 101, and the following distance 105a between the vehicle 101 and the preceding vehicle 102a will increase. Then, for example, when the another vehicle 102d, which has cut in, changes its way to the passing lane, the preceding vehicle 102a is seen from the vehicle 101 again, and the following distance 105a between the vehicle 101 and the preceding vehicle 102a increases. In such a case, when the preceding vehicle 102a is captured to determine the vehicle model or the like from the image, it may be expected that the image of the preceding vehicle 102a is so small that the determination of the vehicle model or the like is difficult. On the other hand, since characters (numbers) in the number plate 803 is larger than characters or the like indicated in the vehicle model plate 111, determination of the characters in the number plate 803 is relatively easy even when the following distance 105a is relatively long. Therefore, with information on the danger or the like of another vehicle 102 of interest being stored in the memory 206 or the like in association with the information on the number plate 803, the information on the danger in the another vehicle 102 can be acquired based on the information on the number plate 803 without determination of the vehicle model. Therefore, after the completion of the determination on the danger in another vehicle 102, it is preferable to store the information on the danger or the like of another vehicle 102 in the memory 206 or the like in association with the information on the number plate 803 of the another vehicle 102.

Further, in the third embodiment, the case where the cloud computer 702 or the control unit 202 accurately determines the vehicle model or the like of another vehicle 102 and determines the distance to the another vehicle 102 based on the size of the vehicle for the vehicle model of interest pre-stored in the database 703 and the size of the another vehicle 102 in an image has been described as an example. However, the invention is not limited thereto. For example, in a state where it is determined that the vehicle model of another vehicle 102 is A or B but it is not determined which of A or B the vehicle model of another vehicle 102 is, a process described below may be applied when it is known in advance that the vehicle width of A and the vehicle width of B are the same. That is, it is not necessary to determine which of A or B the vehicle model of another vehicle 102 is. Since the vehicle width is the same whether the vehicle model of another vehicle 102 is A or B, there is no problem in determination of the distance to another vehicle 102 of interest even when it is not known which of A or B the vehicle model of another vehicle 102 is.

Further, in calculation of the distance to another vehicle (step S302) in each embodiment, the distance to another vehicle 102 may be determined based on the size in an image of an object whose size is known provided in the another vehicle 102. For example, the size of a number plate is known. Therefore, based on a known size of a number plate and the size of a number plate included in an image, the distance to another vehicle 102 on which the number plate is provided can be calculated. Note that the object having a known size is not limited to a number plate. For example, when the size of the vehicle model plate 111 or the like is known, the distance to another vehicle 102 on which the vehicle model plate 111 of interest is provided can be detected based on the size of the vehicle model plate 111 of interest included in the image.

Further, in each embodiment, information on a yaw rate, a steering angle, or the like may be further acquired. Thereby, it is possible to recognize the state of the vehicle 101 more accurately.

Further, while the case where the motive power source of the vehicle 101 is an engine has been described as an example in each embodiment, the motive power source of the vehicle 101 is not limited to an engine. For example, the motive power source of the vehicle 101 may be a motor or the like.

Further, in each embodiment, the vehicle 101 may have a function of cruise control intended to maintain a constant traveling speed and a function of maintaining a constant following distance 105*a* to the preceding vehicle 102*a*. For example, such control is called adaptive cruise control. That is, in adaptive cruise control, the following distance 105*a* may be set based on danger in the preceding vehicle 102*a*.

Further, in each embodiment, for example, in a situation where the vehicle 101 and the preceding vehicle 102*a* come close to each other, control as described below may be applied. For example, such control that reduces the traveling speed of the vehicle 101 to a target speed is performed in a period obtained by dividing the following distance 105*a* between the vehicle 101 and the preceding vehicle 102*a* by a relative speed. In such a case, the target speed is set below the speed of the preceding vehicle 102*a*, for example.

Further, for each embodiment, how to address a case where the control unit 202 detects another vehicle 102*c* (see FIG. 1) that is about to come from a side road based on an image acquired by the imaging unit 201, for example, will be described. In such a case, it is preferable to keep on sequentially detecting whether or not the another vehicle 102*c* enters the lane on which the vehicle 101 travels based on the acquired image or distance information and control the vehicle 101 in accordance with a detection result. That is, it is preferable to control the traveling speed or the steering direction of the vehicle 101 so as to reduce the possibility of contact with another vehicle 102 in accordance with the vehicle speed (motion) or the position of another vehicle 102*c*. Also in such a case, the traveling speed or the steering direction can be more accurately controlled by further taking the danger in another vehicle 102 into consideration.

Further, while the case where the imaging unit 201 has sensitivity to a visible wavelength range has been described as an example in each embodiment, the imaging unit 201 may have sensitivity to a wavelength range that is different from the visible wavelength range. For example, the imaging unit 201 may have sensitivity to an infrared wavelength range. Further, when the imaging unit 201 having sensitivity to an infrared wavelength range is used, a projector that emits an infrared ray (not illustrated) may be provided to the vehicle 101, for example. Such a projector may project a light in synchronization with capturing or may always project a light.

The present invention can also be realized by a process in which a program that implements one or more functions of the embodiments described above is supplied to a system or a device via a network or a storage medium and then one or more processors in a computer of the system or the device read out and execute the program. Further, the present invention can be realized by using a circuit (for example, an ASIC) that implements one or more functions.

As described above, according to the present invention, since a signal for controlling a subject vehicle is generated based on danger in another vehicle, a control device and a control method that may further improve safety of the subject vehicle can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control device comprising a control unit that controls a vehicle, wherein the control unit:
   acquires information on a driver of another vehicle, and
   generates and outputs a signal for controlling traveling of the vehicle based on information on the driver of the another vehicle,
   wherein the signal for controlling the vehicle is generated based on danger in the another vehicle, a distance from the vehicle to the another vehicle, and a stopping distance estimated from a traveling speed of the vehicle, and
   wherein the distance from the vehicle to the another vehicle is calculated based on information on a size of the another vehicle and a size of the another vehicle included in an image of the another vehicle.

2. The control device according to claim 1, wherein the control unit acquires information on the driver of the another vehicle based on an image of the another vehicle captured by an imaging unit.

3. The control device according to claim 2, wherein the control unit acquires information on the driver of the another vehicle by detecting a particular subject that enables estimation of an age of the driver of the another vehicle from the image of the another vehicle.

4. The control device according to claim 2, wherein the control unit acquires information on the driver of the another vehicle by detecting a particular label indicating a driver attached to the another vehicle from the image of the another vehicle.

5. The control device according to claim 2, wherein the control unit acquires information on the driver of the another vehicle from the image of the driver of the another vehicle.

6. The control device according to claim 5 further comprising a determination unit that stores a trained program that, based on an image of a driver who is driving a vehicle, outputs information on the driver,
   wherein the trained program is a result of machine learning of images having various patterns with respect to a face orientation, a line of sight, motion, and a posture of a driver, and
   wherein the control unit acquires information on the driver of the another vehicle output from the determination unit by inputting the image of the driver of the another vehicle to the determination unit.

7. The control device according to claim 2, wherein the control unit acquires information on the driver of the another vehicle by estimating at least one of an age, pulses, and a health condition of the driver from the image of the driver of the another vehicle.

8. The control device according to claim 2, wherein the control unit acquires information on the driver of the another vehicle by detecting a face orientation, a line of sight, a blink interval, motion, or a posture of the driver from the image of the driver of the another vehicle.

9. The control device according to claim 1, wherein the control unit acquires information on the driver of the another vehicle by receiving information on the driver of the another vehicle transmitted from the another vehicle or a server.

10. The control device according to claim 1, wherein the control unit causes an alert generation unit provided in the vehicle to provide notification of an alert based on information on the driver of the another vehicle.

11. The control device according to claim 1, wherein the control unit acquires vehicle information regarding a vehicle body of the another vehicle and generates a signal for controlling the vehicle based on the vehicle information.

12. The control device according to claim 11, wherein the control unit acquires an image of the another vehicle and acquires vehicle information of the another vehicle by detecting at least one of a vehicle model, a grade name, and a model year of the another vehicle from the image.

13. The control device according claim 1, wherein danger in the another vehicle is determined based on zigzag driving or lane deviation of the another vehicle.

14. The control device according to claim 13, wherein danger in the another vehicle is determined based on a frequency of the zigzag driving of the another vehicle or a frequency of the lane deviation of the another vehicle.

15. The control device according to claim 1, wherein danger in the another vehicle is determined based on a following distance between a first another vehicle of a plurality of another vehicles and a second another vehicle traveling in front of the first another vehicle.

16. The control device according to claim 1, wherein danger in the another vehicle is determined based on safety equipment or an automatic driving function provided in the another vehicle.

17. The control device according to claim 16, wherein the safety equipment or the automatic driving function provided in the another vehicle is determined based on at least any one of a vehicle model, a grade name, and a model year of the another vehicle.

18. The control device according to claim 17, wherein the vehicle model, the grade name, or the model year of the another vehicle is determined based on an image of the another vehicle or a character included in an image of the another vehicle.

19. The control device according to claim 18, wherein in searching the image of the another vehicle for the character included in the image of the another vehicle, a first search to search an upper region of a taillight of the another vehicle for the character is performed, a second search to search an lower region of the taillight of the another vehicle for the character is performed when the character is not detected in the first search, and a third search to search a region between the taillight on a left side and the taillight on a right side for the character is performed when the character is not detected in the second search.

20. The control device according to claim 17, wherein the vehicle model, the grade name, or the model year of the another vehicle is determined by a cloud computer provided on a server outside the vehicle.

21. The control device according to claim 1, wherein the signal for controlling the vehicle is a brake control signal, a motive power control signal, or a steering control signal.

22. The control device according to claim 1, wherein the distance from the vehicle to the another vehicle is calculated based on a parallax in parallax images acquired by an imaging unit.

23. The control device according to claim 1, wherein danger in the another vehicle or the signal for controlling the vehicle is determined or generated by the control unit.

24. The control device according to claim 1, wherein danger in the another vehicle or a signal for controlling the vehicle is determined or generated by a cloud computer.

25. The control device according to claim 1, wherein the control unit generates a signal for controlling the vehicle based on
vehicle speed information of the vehicle detected by a vehicle speed sensing unit, and
distance information of the vehicle on a distance to the another vehicle detected by a distance sensing unit.

26. A control method performed by a control unit that controls a vehicle, the control method comprising steps of:
acquiring information on a driver of another vehicle;
generating a signal for controlling traveling of the vehicle based on information on the driver of the another vehicle; and
outputting the signal,
wherein the signal for controlling the vehicle is generated based on danger in the another vehicle, a distance from the vehicle to the another vehicle, and a stopping distance estimated from a traveling speed of the vehicle, and
wherein the distance from the vehicle to the another vehicle is calculated based on information on a size of the another vehicle and a size of the another vehicle included in an image of the another vehicle.

27. A non-transitory storage medium having stored thereon a program that causes a computer to perform steps of:
acquiring information on a driver of another vehicle;
generating a signal for controlling traveling of a vehicle based on information on the driver of the another vehicle; and
outputting the signal,
wherein the signal for controlling the vehicle is generated based on danger in the another vehicle, a distance from the vehicle to the another vehicle, and a stopping distance estimated from a traveling speed of the vehicle, and
wherein the distance from the vehicle to the another vehicle is calculated based on information on a size of the another vehicle and a size of the another vehicle included in an image of the another vehicle.

* * * * *